United States Patent
VanBiervliet

(10) Patent No.: US 8,393,902 B2
(45) Date of Patent: Mar. 12, 2013

(54) METHOD TO CONTROL THE MOVEMENTS OF A FLIGHT SIMULATOR AND FLIGHT SIMULATOR IMPLEMENTING SUCH METHOD

(75) Inventor: Filip VanBiervliet, La Hulpe (BE)

(73) Assignee: W.ING.S. sprl, La Hulpe (BE)

( * ) Notice: Subject to any disclaimer, the term of this patent is extended or adjusted under 35 U.S.C. 154(b) by 1099 days.

(21) Appl. No.: 12/083,496

(22) PCT Filed: Oct. 12, 2006

(86) PCT No.: PCT/EP2006/009841
§ 371 (c)(1), (2), (4) Date: Jul. 23, 2008

(87) PCT Pub. No.: WO2007/042290
PCT Pub. Date: Apr. 19, 2007

(65) Prior Publication Data
US 2009/0047636 A1   Feb. 19, 2009
US 2011/0070564 A2   Mar. 24, 2011

(30) Foreign Application Priority Data
Oct. 12, 2005 (EP) .................................. 05447231

(51) Int. Cl.
*G09B 9/00* (2006.01)

(52) U.S. Cl. ............... 434/30; 434/28; 434/29; 434/35; 434/38; 434/45; 434/46; 434/49; 434/51; 434/55; 434/59

(58) Field of Classification Search .............. 434/28, 434/29, 46, 49, 59, 30, 35, 38, 45, 54, 55
See application file for complete search history.

(56) References Cited

U.S. PATENT DOCUMENTS

| | | | |
|---|---|---|---|
| 3,678,256 A * | 7/1972 | Harenberg, Jr. | 701/16 |
| 3,732,630 A | 5/1973 | Crosbie et al. | |
| 3,989,208 A * | 11/1976 | Lambregts | 244/182 |
| 4,956,780 A * | 9/1990 | Sankrithi et al. | 701/16 |
| 5,179,525 A * | 1/1993 | Griffis et al. | 703/1 |

(Continued)

FOREIGN PATENT DOCUMENTS

| JP | 08-248872 | 9/1996 |
|---|---|---|
| JP | 2001-017748 | 1/2001 |

(Continued)

OTHER PUBLICATIONS

M. Baarspul, "The Generation of Motion Cues on a Six-Degrees-of-Freedom Motion System", Jun. 1977, Delft University of Technology Department of Aerospace Engineering, pp. 1-112.*

(Continued)

*Primary Examiner* — Xuan Thai
(74) *Attorney, Agent, or Firm* — Bacon & Thomas, PLLC

(57) ABSTRACT

The invention relates to a method to control the movements of a flight simulator involving linear and angular accelerations perceived at a pilot's seat and involving mathematical transformations of a lateral position y and a roll angle φ for said accelerations, wherein mathematical transformations are used with at least one of the following corrections: —Feedforward of a specific force error due to the y-position washout into a roll angle transformation function; —Decomposition of specific force at pilot's position and addition of complementary filters to reproduce suitable side forces in the pilot's seat due to lateral accelerations; —Mathematical transformations linking a pilot's position in an aircraft and flight simulator to a motion base centroid.

17 Claims, 22 Drawing Sheets

U.S. PATENT DOCUMENTS

| | | | | |
|---|---|---|---|---|
| 5,195,700 | A | * | 3/1993 | Fogler et al. ............... 244/17.21 |
| 5,353,242 | A | * | 10/1994 | Crosbie et al. ..................... 703/8 |
| 5,433,608 | A | | 7/1995 | Murray |
| 5,711,670 | A | * | 1/1998 | Barr ............................... 434/55 |
| 5,762,068 | A | * | 6/1998 | dePinto ......................... 600/509 |
| 7,236,914 | B1 | * | 6/2007 | Zyskowski ........................ 703/8 |
| 7,496,865 | B2 | * | 2/2009 | Chang et al. .................. 716/133 |
| 2004/0077464 | A1 | * | 4/2004 | Feldman et al. ................ 482/57 |
| 2004/0128096 | A1 | * | 7/2004 | Luo ................................. 702/96 |
| 2007/0057732 | A1 | * | 3/2007 | Chang et al. .................. 330/303 |

FOREIGN PATENT DOCUMENTS

| | | |
|---|---|---|
| JP | 2003-288001 | 10/2003 |
| WO | 98/58509 A1 | 12/1998 |

OTHER PUBLICATIONS

Russell V. Parrish et al., "Motion Software for a Synergistic Six-Degree-of-Freedom Motion Base," p. 9, NASA TN D-7350, Dec. 1973.

G.A.J. van de Moeskijk et al., "Investigation to Improve the Motion Software of the Fokker F-28 Flight Simulator," Delft University of Technology, Dept. of Aerospace Engineering, p. 4, Report LR-358, Sep. 1982.

O.H. Gerlach, Tecnische Hogeschool Delft, Vliegeigenschappen 1, p. 227, Dictaat D 26-II, Nov. 1981.

H. Wittenberg, Technische Hogeschool Delft, "Elementaire beschouwing over de samenhang tussen besturing, stabiliteit en demping bij vliegtuigen," Memorandum M-319, Oct. 1979, p. 5-7.

Flip Van Biervliet, Technische Hogeschool Delft, "Ontwerp en evaluatie van stuurcommandosysteem-regeiwetten met de quickened display methode," bijlage 2 Ingenieursverslag, Feb. 1982.

International Search Report dated Jan. 23, 2007 established in International Application PCT/EP2006/009841.

Action of China IP Office regarding China Patent Application 200680037804.2, Mar. 16, 2011.

Office Action of China Patent Office (PRC) regarding CN 200680037804.2, with English translation, Mar. 26, 2010.

Examination Report of China Patent Office Regarding Chinese Patent application No. 200680037804.2; Sep. 4. 2009.

Russian Office Action issued in related application No. 2008118206/08 (021029), dated Sep. 27, 2010, 4 pages.

M. Baarspul, Delft University of Technology, "The Generation of Motion Cues on a Six-Degrees-of-Freedom Motion System", p. 5, Report LR-248, Jun. 1977.

M Baarspul, Delft University of Technology, "The Generation of Motion Cues on a Six-Degrees-of-Freedom Motion System" , p. 6, Report LR-248, Jun. 1977.

J.B. Sinacori, Northrop Corporation, "A Practical Approach to Motion Simulation", p. 13, AIAA paper 73-931. Sep. 1973.

Susan A. Riedel and L.G. Hofmann, Systems Technology Inc., "Investigation of Nonlinear Motion Simulator Washout Schemes", p. 524. p. 530. Proceedings of the $14^{th}$ Annual Conference on Manual Control, Nov. 1978.

Susan A Riedel and L. G. Hofmann, STI, "Manned Engineering Flight Simulator Validation", p. 172. STI-TR-1110-1, AFFDL-TR 78-192 FT-1, Feb. 1979.

David L. Quam. University of Dayton, Ohio, "Human Pilot Perception Experiments". p. 263, Proceedings of the $15^{th}$ Annual Conference on Manual Control, Nov. 1979.

Irving L. Ashkenas, STI, "Collected Flight and Simulation Comparisons and Considerations", pp. 16-26, AGARD CP408 Flight Simulation, Oct. 1985.

Reidel, Susan A., "Investigation of Nonlinear Motion Simulator Washout Schemes", 14th Annual Conference on Manual Control pp. 521-532, 1978.

Schmidt, Stanley F. and Conrad, Bjorn, "Motion Drive Signals for Piloted Flight Simulators", NASA CR-1601, May 1970.

Reid, L.D., "Flight Simulation Motion-Base Drive Algorithms: Part 1—Developing and Testing the Equations", Institute for Aerospace Studies, University of Toronto, UTIAS Report No. 296, Dec. 1985.

Reid, L.D., "Flight Simulation Motion-Base Drive Algorithms: Part 2—Selecting the System Parameters", Institute for Aerospace Studies, University of Toronto, UTIAS Report No. 307, May 1986.

Romano, Richard, "Non-linear Optimal Tilt Coordination for Washout Algorithms", AIAA Modelling and Simulation Technologies Conference and Exhibit, Aug. 11-14, 2003.

Advani, Sunjoo, "Towards Standardising High-Fidelity Cost-Effective Motion Cueing in Flight Simulation", Royal Aeronautical Society Spring Simulation Conference, Jun. 2006.

Schroeder, Jeffrey, "Simulation Motion Requirements for Coordinated Maneuvers", Journal of the American Helicopter Society, vol. 46, No. 3, Jul. 2001.

Grant, Peter, "Analyzing Classes of Motion Drive Algorithms Based on Paired Comparison Techniques", Driving Simulation Conference Proceedings, Oct. 8-10, 2003.

Reid, Lloyd, "Augmenting Flight Simulator Motion Response to Turbulence", Journal of Aircraft, vol. 27, No. 4, 1990, pp. 306-311.

Reid, L.D., "Flight Simulation Motion-Base Drive Algorithms: Part 3—Pilot Evaluations", Institute for Aerospace Studies, University of Toronto, UTIAS Report No. 319, Dec. 1986.

China IP Office action regarding Chinese Patent Application no. 200680037804.2, Aug. 31, 2011.

Japanese Office communication regarding Japanese Patent Application No. 534934/2008, Feb. 7, 2012.

EPO Notice of Opposition, EP patent No. 1946193, Jan. 31, 2011.

EPO Preliminary Opinion of the Opposition Division, EP patent No. 1946193, Mar. 2, 2012.

* cited by examiner

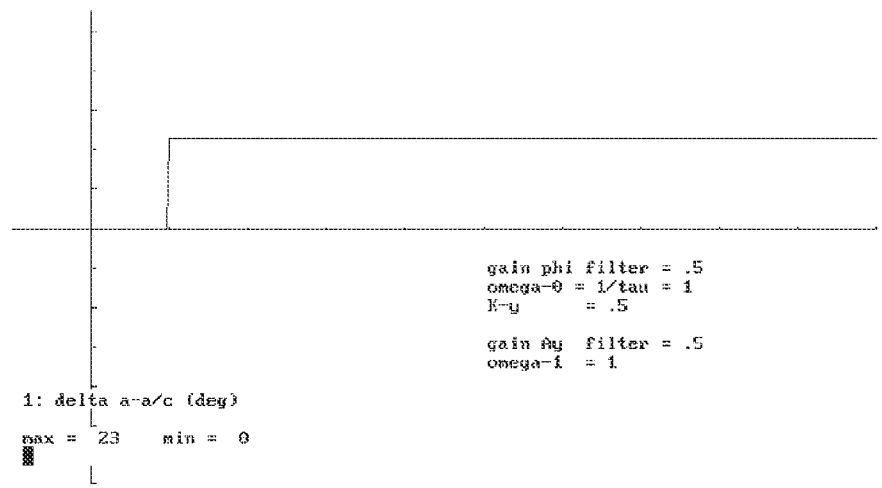
Figure 6.1
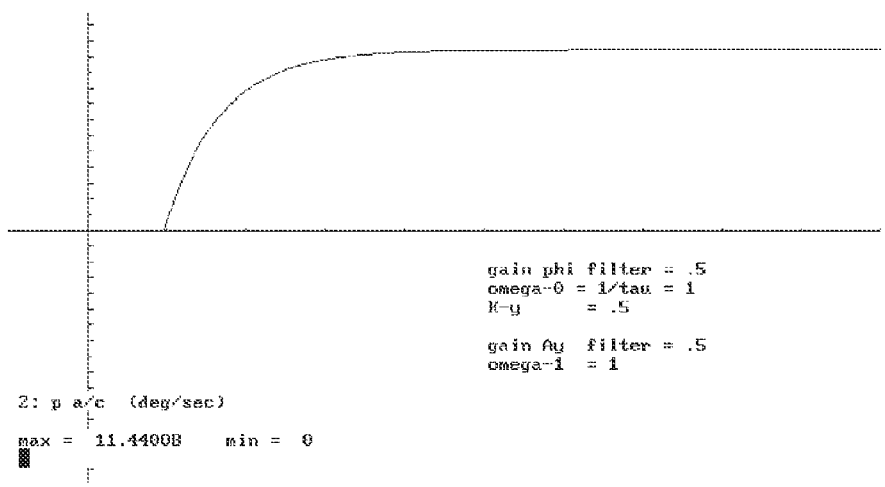
Figure 6.2
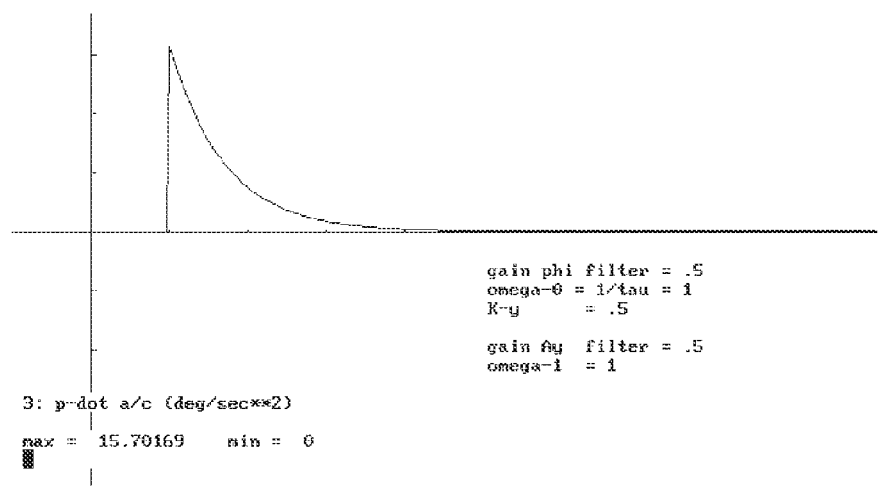
Figure 6.3

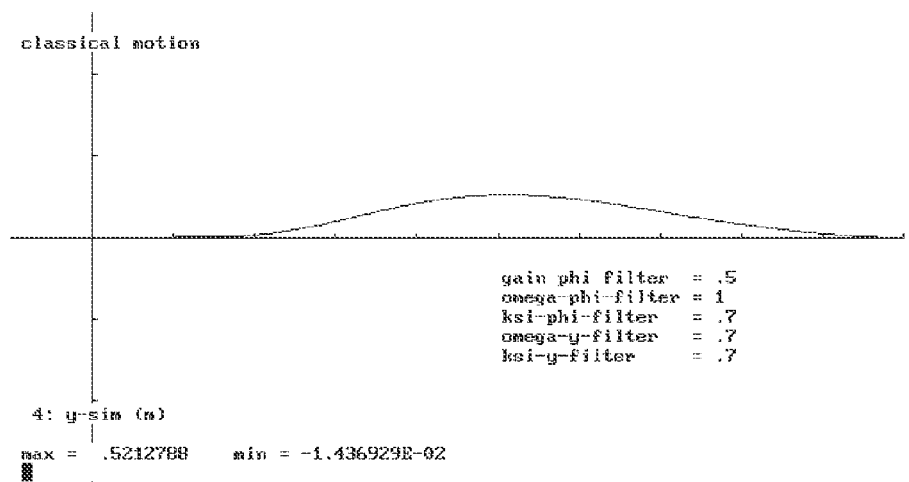
Figure 11.1
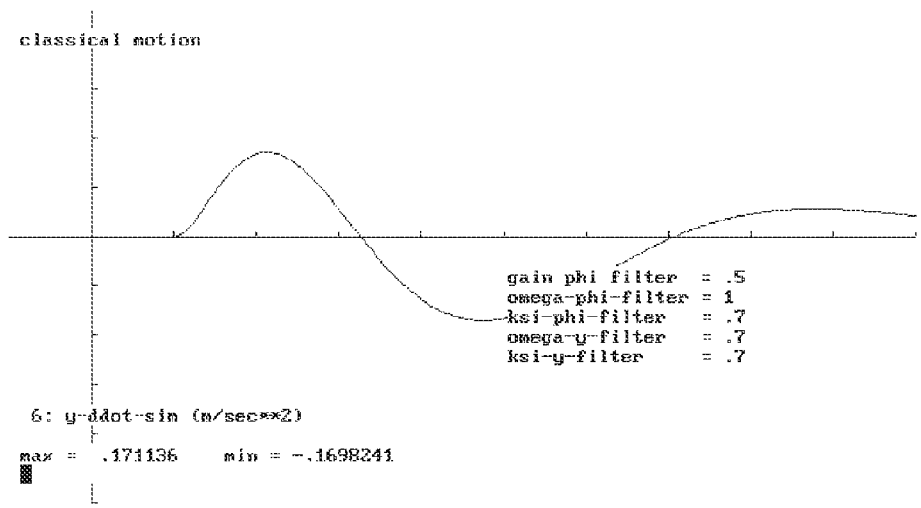
Figure 11.2
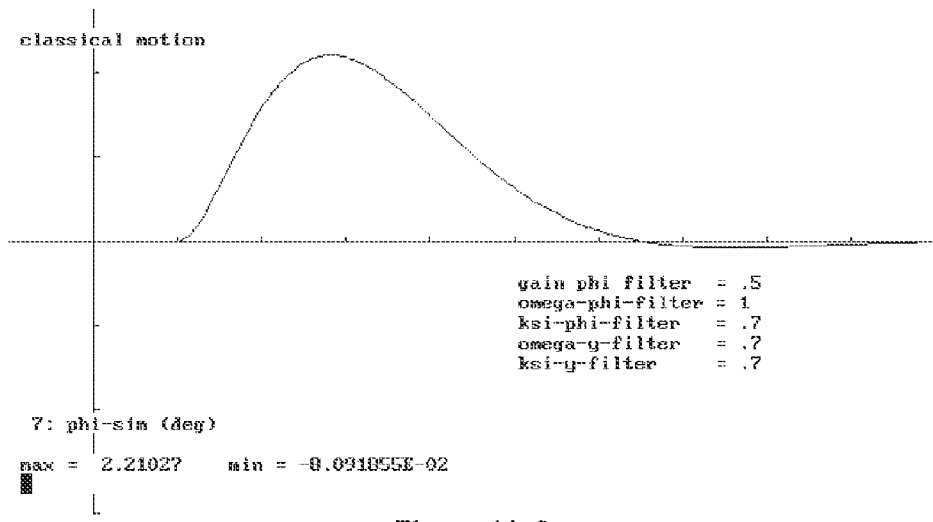
Figure 11.3

METHOD TO CONTROL THE MOVEMENTS OF A FLIGHT SIMULATOR AND FLIGHT SIMULATOR IMPLEMENTING SUCH METHOD

TECHNICAL FIELD OF THE INVENTION

The present invention relates to flight simulators and methods for controlling flight simulators.

BACKGROUND OF THE INVENTION

Flight simulator motion systems, or in short flight simulators, are provided with 6 degrees of freedom motion systems. Flight simulators provide motion cueing fidelity from manoeuvres through filtering of angular accelerations and (linear) specific forces. These signals are important for pilot perception, and therefore the motions of the flight simulators should be brought into agreement with motions of an actual aircraft. The following algorithms are found in prior art methods for controlling flight simulators.

Centroid Transformation

As it is the intention to simulate motion as perceived by the pilot, the flight simulator is located hypothetically in the aircraft with corresponding pilots' reference point P (FIG. 4).

The following logic (FIG. 8) is always encountered in literature (see Russell V. Parrish, James E. Dieudonne and Dennis J. Martin Jr., "Motion software for a synergistic six-degrees-of-freedom motion base" p. 9, NASA TN D-7350, December 1973/M. Baarspul, Delft University of Technology, "The generation of motion cues on a six-degrees-of-freedom motion system" p. 5, Report LR-248, June 1977/G. A. J. van de Moesdijk, F. L. Van Biervliet, Delft University of Technology, "Investigation to improve the motion software of the Fokker F-28 flight simulator" p. 4, Report LR-358, September 1982) and in practical applications:

Specific forces are computed in the aircraft at the hypothetical platform centroid location according to the formulas given in: O. H. Gerlach, Technische Hogeschool Delft, "Vliegeigenschappen 1" p. 227, Dictaat D 26, October-November 1981/M. Baarspul, Delft University of Technology, "The generation of motion cues on a six-degrees-of-freedom motion system" p. 6, Report LR-248, June 1977:

For example in the y-direction:

$$A_{ycentroid} = A_{ycg} + (pq + \dot{r}) \cdot xc_{ac} + (rq - \dot{p}) \cdot zc_{ac}$$

with Ay-centroid the y-component of the specific force at the hypothetical centroid location of the simulator with respect to the aircraft reference system, Ay-cg the y-component of the specific force at the centre of gravity of the aircraft, p the roll rate, q the pitch rate, r the yaw rate, $\dot{p}$ the roll angular acceleration, $\dot{r}$ the yaw angular acceleration, xc-ac the x-coordinate of the centroid in the aircraft reference system and zc-ac the z-coordinate of the centroid in the aircraft reference system. In most cases zc-ac is being neglected.

The motion program uses the 3 corrected specific force components Ax-centroid, Ay-centroid, Az-centroid and the 3 angular rates (or accelerations) p, q, r as input. The 6 output signals of the motion program command the motion platform centroid position (3 co-ordinates) as well as the 3 Euler angles.

Roll Angular Acceleration Simulation (FIG. 9)

Roll rate multiplied with a down tuning gain Kd is filtered through a roll high pass filter ($1^{st}$ or $2^{nd}$ order). The co-ordinating path uses lateral sway in order to keep "gravity alignment". In order to keep lateral position within the simulator boundaries, lateral position is sent through a y-wash-out filter, generally $2^{nd}$ order. The output of the program is simulator roll angle $\phi$ and centroid position y.

These filters may be adaptive which means that Kd could be continuously adapted according to a given cost criterion.

Lateral Specific Force Simulation (FIG. 10):

Lateral specific force computed at the hypothetical centroid position is multiplied by a down tuning gain and is then sent through two different filters: a high pass position filter and a low pass angular filter. These filters are in most cases of $2^{nd}$ order and are not complementary. They may well be adaptive. Again the output of the filters is 'centroid position' and not the position of the pilot.

Prior art flight simulators, with at least sway and roll as a degree of freedom, invariantly behave as follows: when considering flying co-ordinated turn only by means of aileron input, at the beginning of the maneuver, pilot's perception seems to be correct. The roll onset as well as lateral specific force onset are perceived. A few moments later however, one notices a spurious opposite lateral specific force. It feels like if the aircraft were in a sideslip, which is not the case.

Also during ground-taxi manoeuvres, there is very little correlation between lateral motion perception and visual information. One always has the impression of side slipping on the runway.

These problems are set out in more detail below.

Roll Manoeuvre

Consider a typical flight simulator motion response in FIG. 11 to the step aileron input maneuver of FIG. 6.

For the graphs, 2nd order filters were used as they are most often being used. The only input to the filters comes from roll rate. There is no input to the lateral specific force filter as z-position of the centroid (zc-ac) is in most cases neglected.

Angular roll acceleration (FIG. 11.4) shows a sign reversal which is inherent to high pass filtered roll acceleration.

The time response of the lateral specific force at the pilots' reference point P (FIG. 11.5) shows the following characteristics:

1° Initial peak value is correct. This acceleration is due to $\Delta \ast \dot{\phi}$. The centroid transformation as previously discussed only takes into account the hypothetical position xc-ac of the centroid relative to the aircraft centre of gravity (c.g.). There is no consideration for the vertical co-ordinate zc-ac of the centroid nor with the distance $\Delta$, the vertical distance between the pilot's reference point P and the centroid c, i.e. the geometrical centre of gravity of the simulator platform. As the pilot is situated in the aircraft above the point of initial roll acceleration and as the simulator is driven to roll around its centroid, the initial lateral specific forces are roughly similar in the aircraft (a/c) and in the simulator (sim).

2° This initial peak is followed a few moments later by an important opposite spurious side force. This spurious force is detrimental to the flight simulator motion fidelity. It can be found in literature as "leaning, student on the pedals, not in phase" etc. (J. B. Sinacori, Northrop Corporation, "A practical approach to motion simulation" p 13, AIAA paper 73-931, September 1973/Susan A. Riedel and L. G. Hofmann, Systems Technology Inc., "Investigation of nonlinear motion simulator washout schemes" p 524, p 530, Proceedings of the 14th Annual Conference on Manual Control, November 1978/Susan A. Riedel and L. G. Hofmann, STI, "Manned engineering flight simulator validation" p. 172, STI-TR-1110-1, AFFDL-TR-78-192-FT-1, February 1979/David L. Quam, University of Dayton, Ohio, "Human pilot perception experiments" p. 263, Proceedings of the 15th Annual Conference on Manual Control, November 1979/Irving L. Ashkenas, STI, "Collected flight and simulation comparisons and considerations" p. 16-26, AGARD CP408 Flight Simulation, October 1985).

This phenomenon is entirely due to the presence of the y-washout filter as illustrated in FIG. 9. If there weren't such a filter, platform movement would remain perfectly co-ordinated. However the simulator would wander away. The y-washout filter is necessary to "call back" the simulator, hence introducing "un" co-ordination.

The only way to suppress this phenomenon in the existing scheme is to reduce the gain Kd to very low values. One doesn't perceive any movement any more through motion, however this is considered less worse than spurious motion.

Ground Taxi Manoeuvre

During taxi manoeuvres on ground the simulated aircraft does not roll, so only the lateral specific force filters play a major role.

There is always distortion in perceived motion: when using the rudder or nose wheel steering, initial response is felt (from the y hp filter). When this fades away sustained lateral acceleration comes up from the φ low-pass filter. Both movements do not blend into each perfectly as the filters are not complementary.

SUMMARY OF THE INVENTION

It is an object of the present invention to provide good lateral motion cueing fidelity in flight simulators, flight simulators with such good lateral motion cueing fidelity and methods for controlling such flight simulators. It is an object of the present invention to at least overcome some of the deficiencies mentioned above.

The above objective is accomplished by a method and device according to the present invention.

In a first aspect, the present invention provides methods to control movements of a flight simulator, resulting in improved motion perception for a pilot using the flight simulator.

In a first embodiment of the first aspect, the present invention provides a method to control the movements of a flight simulator, involving linear and angular accelerations perceived by a pilot seated at a pilot's seat, whereby roll rate and yaw rate, as well as a specific force in a lateral direction calculated according to a model of a simulated aircraft in a fixed point of the simulated aircraft are converted by a motion program to a lateral position and a roll angle of the simulator. In the first embodiment, the method comprises calculating the roll angle of the simulator due to simulated aircraft roll angle by correcting an originally calculated value of the roll angle with a correction factor proportional to a lateral specific force induced by a wash-out filter used during the earth gravity alignment calculation of the lateral position of the simulator.

Calculating the roll angle of the simulator may comprise using a mathematical transformation involving the feed-forward of a correction angle in the roll angle transformation function according to the formulae $$\varphi_{cor} = K_y \cdot \varphi_{hp} - \ddot{y}_{roll}/g$$

$$\varphi_{roll} = \varphi_{hp} - \varphi_{cor}$$

where
- φ-hp equals high pass filtered simulator roll angle,
- ÿ-roll equals lateral position acceleration of the pilots' reference point P,
- g is the earth gravity constant,
- Ky is a gain lateral co-ordination factor, and
- φ-roll equals the simulator roll angle as a result of aircraft roll acceleration or roll rate.

In said mathematical transformation a lateral co-ordination factor Ky between 0 and 1 may be introduced, allowing to reduce lateral travel at the expense of some acceptable spurious lateral specific force, by modulating between 'no co-ordination' (Ky=0) and 'full co-ordination' (Ky=1). The roll angle may be obtained by a 3rd or $4^{th}$ order high-pass filter, leading to Ky=1, and lateral acceleration may at each time equal to this roll angle multiplied by the earth acceleration.

The mathematical transformation may involve a $2^{nd}$ order roll angle high pass filter and a $1^{st}$ order y-washout filter, according to the transfer function formulae:

$$\left[\frac{\varphi_{hp}}{p_{ltd}}\right] = \frac{P}{P^2 + 2\xi\omega_0 P + \omega_0^2}$$

$$\left[\frac{\ddot{y}_{roll/g}}{\varphi_{hp}}\right] = K_y \cdot \frac{P}{P + \frac{1}{\tau}}$$

where $p_{ltd}$ is the input roll rate limited through a down tuning gain factor Kd, and optionally a roll rate limiting function, in such way that for a step in aileron command, the simulator lateral travel is of finite value.

In a method according to embodiments of the present invention, the second component of the specific force in the lateral direction may be obtained by means of a first set of two complementary filters for roll acceleration and a second set of two complementary filters for yaw acceleration. In each set of complementary filters, one is for commanding a simulator lateral excursion and the other is for commanding a simulator roll angle. The complementary filters may be according to the transfer function formulae $$\left[\frac{y_{A_{yp}}}{p_{ltd}}\right] = -zp_{ac} \cdot \frac{P + 2\xi\omega_1}{P^2 + 2\xi\omega_1 P + \omega_1^2}$$

$$\left[\frac{\varphi_{A_{yp}}}{p_{ltd}}\right] = \frac{zp_{ac}}{g} \cdot \frac{\omega_1^2 \cdot P}{P^2 + 2\xi\omega_1 P + \omega_1^2}$$

and $$\left[\frac{y_{A_{yr}}}{r_{ltd}}\right] = xp_{ac} \cdot \frac{P + 2\xi\omega_2}{P^2 + 2\xi\omega_2 P + \omega_2^2}$$

$$\left[\frac{\varphi_{A_{yr}}}{r_{ltd}}\right] = -\frac{xp_{ac}}{g} \cdot \frac{\omega_2^2 P}{P^2 + 2\xi\omega_2 P + \omega_2^2}$$

where $p_{ltd}$ and $r_{ltd}$ are input roll and yaw rate respectively, limited through a down tuning gain factor Kp and Kr respectively, and optionally through a rate limiting function.

In a second embodiment of the first aspect, the present invention provides a method to control the movements of a flight simulator, involving linear and angular accelerations perceived by a pilot seated at a pilot's seat, whereby roll rate and yaw rate, as well as a specific force in a lateral direction calculated according to a model of a simulated aircraft in a fixed point of the simulated aircraft are converted by a motion program to a lateral position and a roll angle of the simulator. In the second embodiment, the method comprises decomposing the specific force in the lateral direction acting at the pilot's reference point in the simulated aircraft into a first component and a second component, the first component relating to the specific force at a fixed point of the simulated aircraft and the second component having a first term related to accelerations due to yaw and a second term related to roll angular accelerations, according to the formula $$A_{ypilot} = A_y + \dot{r} \cdot xp_{ac} - \dot{p} \cdot zp_{ac}$$

$xp_{ac}$ being the x coordinate of the pilot's reference point in a reference system having an origin at the fixed point of the simulated aircraft and $zp_{ac}$ being the z coordinate of the pilot's reference point in said reference system, $\dot{p}$ being the roll angular acceleration and $\dot{r}$ being the yaw angular acceleration, filtering the first component Ay through two filters, a high-pass and a low-pass filter, filtering each of the terms of the second component by a set of a first and a second complementary filters in parallel, complementary filters being filters whose sum of transfer functions is one, and using the sum of the output of the high-pass filter and the first of the complementary filters of each set to calculate the desired simulator lateral position, and using the sum of the output of the low-pass filter and the second of the complementary filters of each set to calculate the desired simulator roll angle.

In a third embodiment of the first aspect, the present invention provides a method to control the movements of a flight simulator, involving linear and angular accelerations perceived by a pilot seated at a pilot's seat, whereby roll rate and yaw rate, as well as a specific force in a lateral direction calculated according to a model of a simulated aircraft in a fixed point of the simulated aircraft are converted by a motion program to a lateral position and a roll angle of the simulator. In the third embodiment, the method comprises transforming the position of the pilot's reference point in the simulator obtained through the motion program, either by means of a state of the art method or by means of any of the methods of the first or second aspect or by means of a combination thereof, into the position of the simulator centroid. This may be done by a co-ordination transformation taking into account the three Euler angles of the simulator yaw ($\psi$), pitch ($\theta$) and roll ($\phi$) angle.

The method of the third embodiment may furthermore comprise transforming the specific force calculated according to a model of a simulated aircraft in the fixed point of said aircraft into a specific force acting at a pilot's reference point and then giving this transformed specific force as input to the motion program and converting the output of the motion program by a location transformation from the pilot's reference point to the simulator centroid position into signals to command the simulator centroid position. The first transformation may be performed by means of mathematical transformations converting specific forces at the aircraft fixed point to the pilots' reference point P according to $$A_{xpilot}=A_{x_{cg}}-(q^2+r^2)\cdot xp_{ac}+(pr+\dot{q})\cdot zp_{ac}$$

$$A_{ypilot}=A_{y_{cg}}+(pq+\dot{r})\cdot xp_{ac}+(qr-\dot{p})\cdot zp_{ac}$$

$$A_{zpilot}=A_{z_{cg}}+(pr-\dot{q})\cdot xp_{ac}-(p^2+q^2)\cdot zp_{ac}$$

Motion signals to command simulator platform centroid position may be obtained from the motion output pilots' reference point P position according to the formulae $$\begin{bmatrix} x \\ y \\ z \end{bmatrix}_c = \begin{bmatrix} x \\ y \\ z \end{bmatrix}_P - A \cdot \begin{bmatrix} xp_c \\ o \\ zp_c \end{bmatrix}$$

while $$A = \begin{bmatrix} \cos\theta\cos\psi & \sin\varphi\sin\theta\cos\psi - \cos\varphi\sin\psi & \cos\varphi\sin\theta\cos\psi + \sin\varphi\sin\psi \\ \cos\theta\sin\psi & \sin\varphi\sin\theta\sin\psi + \cos\varphi\cos\psi & \cos\varphi\sin\theta\sin\psi - \sin\varphi\cos\psi \\ -\sin\theta & \sin\varphi\cos\theta & \cos\varphi\cos\theta \end{bmatrix}$$

The following simplified equation may be substituted for the centroid y-component $y_c$ $$y_c=y_P-\Delta\cdot\phi$$

$\Delta$ being the vertical distance between the pilot's reference point and the simulator centroid and $\phi$ being the roll angle.

The first, second and third embodiments of the first aspect and their dependent features may be separate embodiments or may be combined with each other.

In embodiments of the present invention, the fixed point of the simulated aircraft may be the centre of gravity of said simulated aircraft. Alternative useful points for the fixed point are other fixed points on the aircraft in the neighbourhood of the centre of gravity.

In a second aspect, the present invention provides a computer program product for executing any of the methods as claimed in any of the previous claims when executed on a computing device associated with a flight simulator simulating an aircraft. The computer program product provides the functionality of any of the above methods according to the present invention when executed on a computing device associated with a flight simulator. The computer program may be part of a computer software product (i.e. a carrier medium) that includes one or more code segments that cause a processor such as a CPU of the processing system to carry out the steps of the method. The program runs under an operating system, and may include a user interface that enables a user to interact with the program. The flight simulator program operates on input data, e.g. a pre-determined flight scheme and generates control data for controlling movements of a flight simulator platform.

In a third aspect, the present invention provides a machine readable data storage device or carrier medium which stores the computer program product of the present invention in a machine readable form and which executes at least one of the methods of the invention when executed on a computing device. Nowadays, such software is often offered on the Internet or a company Intranet for download, hence the present invention includes transmitting the printing computer product according to the present invention over a local or wide area network. The computing device may include one of a microprocessor and an FPGA.

The terms "carrier medium" and "computer readable medium" as used herein refer to any medium that participates in providing instructions to a processor for execution. Such a medium may take many forms, including but not limited to, non-volatile media, volatile media, and transmission media. Non-volatile media include, for example, optical or magnetic disks, such as a storage device which is part of mass storage. Volatile media include dynamic memory such as RAM. Transmission media include coaxial cables, copper wire and fiber optics, including the wires that comprise a bus within a computer. Transmission media can also take the form of acoustic or light waves, such as those generated during radio wave and infra-red data communications.

Common forms of computer readable media include, for example a floppy disk, a flexible disk, a hard disk, magnetic tape, or any other magnetic medium, a CD-ROM, any other optical medium, punch cards, paper tapes, any other physical medium with patterns of holes, a RAM, a PROM, an EPROM, a FLASH-EPROM, any other memory chip or cartridge, a carrier wave as described hereafter, or any other medium from which a computer can read.

Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to the computer system for controlling the simulator platform can receive the data on the telephone line and use an infrared transmitter to convert the data to an infrared signal. An infrared detector coupled to a bus can receive the data carried in the infra-red signal and place the data on the bus. The bus carries data to main memory, from which a processor retrieves and executes the instructions. The instructions received by main memory may optionally be stored on a storage device either before or after execution by a processor. The instructions can also be transmitted via a carrier wave in a network, such as a LAN, a WAN or the internet. Transmission media can take the form of acoustic or light waves, such as those generated during radio wave and infrared data communications. Transmission media include coaxial cables, copper wire and fibre optics, including the wires that form a bus within a computer.

In yet another aspect the present invention provides a controller for controlling the movements of a flight simulator, involving linear and angular accelerations perceived by a pilot seated at a pilot's seat, whereby roll rate and yaw rate, as well as a specific force in a lateral direction calculated according to a model of a simulated aircraft in a fixed point of the simulated aircraft are converted by a motion program to a lateral position and a roll angle of the simulator, wherein the controller comprises any of:

a first calculator adapted for calculating the roll angle of the simulator due to simulated aircraft roll angle by correcting an originally calculated value of the roll angle with a correction factor proportional to a lateral specific force induced by a wash-out filter used during the earth gravity alignment calculation of the lateral position of the simulator, and/or a second calculator adapted for decomposing the specific force in the lateral direction acting at the pilot's reference point in the simulated aircraft into a first component and a second component, the first component relating to the specific force at a fixed point of the simulated aircraft and the second component having a first term related to accelerations due to yaw and a second term related to roll angular accelerations, according to the formula $$A_{ypilot} = A_y + \dot{r} \cdot xp_{ac} - \dot{p} \cdot zp_{ac}$$

$xp_{ac}$ being the x coordinate of the pilot's reference point in a reference system having an origin at the fixed point of the simulated aircraft and $zp_{ac}$ being the z coordinate of the pilot's reference point in said reference system, $\dot{p}$ being the roll angular acceleration and $\dot{r}$ being the yaw angular acceleration, a high-pass filter and a low-pass filter for filtering the first component Ay, two sets of a first and a second complementary filter, complementary filters being filters whose sum of transfer functions is one, for filtering each of the terms of the second component in parallel, a combiner for combining the output of the high-pass filter and the outputs of the first of the complementary filters of each set to calculate the desired simulator lateral position, and a combiner for combining the output of the low-pass filter and the outputs of the second of the complementary filters of each set to calculate the desired simulator roll angle.

and/or a transformator for transforming the position of the pilot's reference point in the simulator obtained through the motion program, either by means of a state of the art method or by means of any of the methods of the first or second aspect or by means of a combination thereof, into the position of the simulator centroid.

In still a further aspect, the present invention provides a flight simulator adapted to perform controlled movements, involving linear and angular accelerations perceived by a pilot seated at a pilot's seat, whereby roll rate and yaw rate, as well as a specific force in a lateral direction calculated according to a model of a simulated aircraft in a fixed point of the simulated aircraft are converted by a motion program to a lateral position and a roll angle of the simulator, wherein the flight simulator comprises any of:

a first calculator adapted for calculating the roll angle of the simulator due to simulated aircraft roll angle by correcting an originally calculated value of the roll angle with a correction factor proportional to a lateral specific force induced by a wash-out filter used during the earth gravity alignment calculation of the lateral position of the simulator, and/or a second calculator adapted for decomposing the specific force in the lateral direction acting at the pilot's reference point in the simulated aircraft into a first component and a second component, the first component relating to the specific force at a fixed point of the simulated aircraft and the second component having a first term related to accelerations due to yaw and a second term related to roll angular accelerations, according to the formula $$A_{ypilot} = A_y + \dot{r} \cdot xp_{ac} - \dot{p} \cdot zp_{ac}$$

$xp_{ac}$ being the x coordinate of the pilot's reference point in a reference system having an origin at the fixed point of the simulated aircraft and $zp_{ac}$ being the z coordinate of the pilot's reference point in said reference system, $\dot{p}$ being the roll angular acceleration and $\dot{r}$ being the yaw angular acceleration, a high-pass and a low-pass filter for filtering the first component Ay, two sets of a first and a second complementary filter, complementary filters being filters whose sum of transfer functions is one, for filtering each of the terms of the second component in parallel, a combiner for combining the output of the high-pass filter and the outputs of the first of the complementary filters of each set to calculate the desired simulator lateral position, and a combiner for combining the output of the low-pass filter and the outputs of the second of the complementary filters of each set to calculate the desired simulator roll angle and/or a transformator for transforming the position of the pilot's reference point in the simulator obtained through the motion program, either by means of a state of the art method or by means of any of the methods of the first or second aspect or by means of a combination thereof, into the position of the simulator centroid.

Particular and preferred aspects of the invention are set out in the accompanying independent and dependent claims. Features from the dependent claims may be combined with features of the independent claims and with features of other dependent claims as appropriate and not merely as explicitly set out in the claims.

The present concepts are believed to represent substantial new and novel improvements, including departures from prior practices, resulting in improved motion cueing fidelity during lateral manoeuvres on ground and in the air.

The teachings of the present invention permit the design of improved flight simulators and methods for controlling flight simulators.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

$$\begin{bmatrix} xp_{ac} \\ 0 \\ zp_{ac} \end{bmatrix}$$

co-ordinates pilots' reference point with respect to centroid c:

$$\begin{bmatrix} xp_c \\ 0 \\ zp_c \end{bmatrix}$$

co-ordinates centroid with respect to aircraft c.g.:

$$\begin{bmatrix} xc_{ac} \\ 0 \\ zc_{ac} \end{bmatrix}$$

Figure 5:
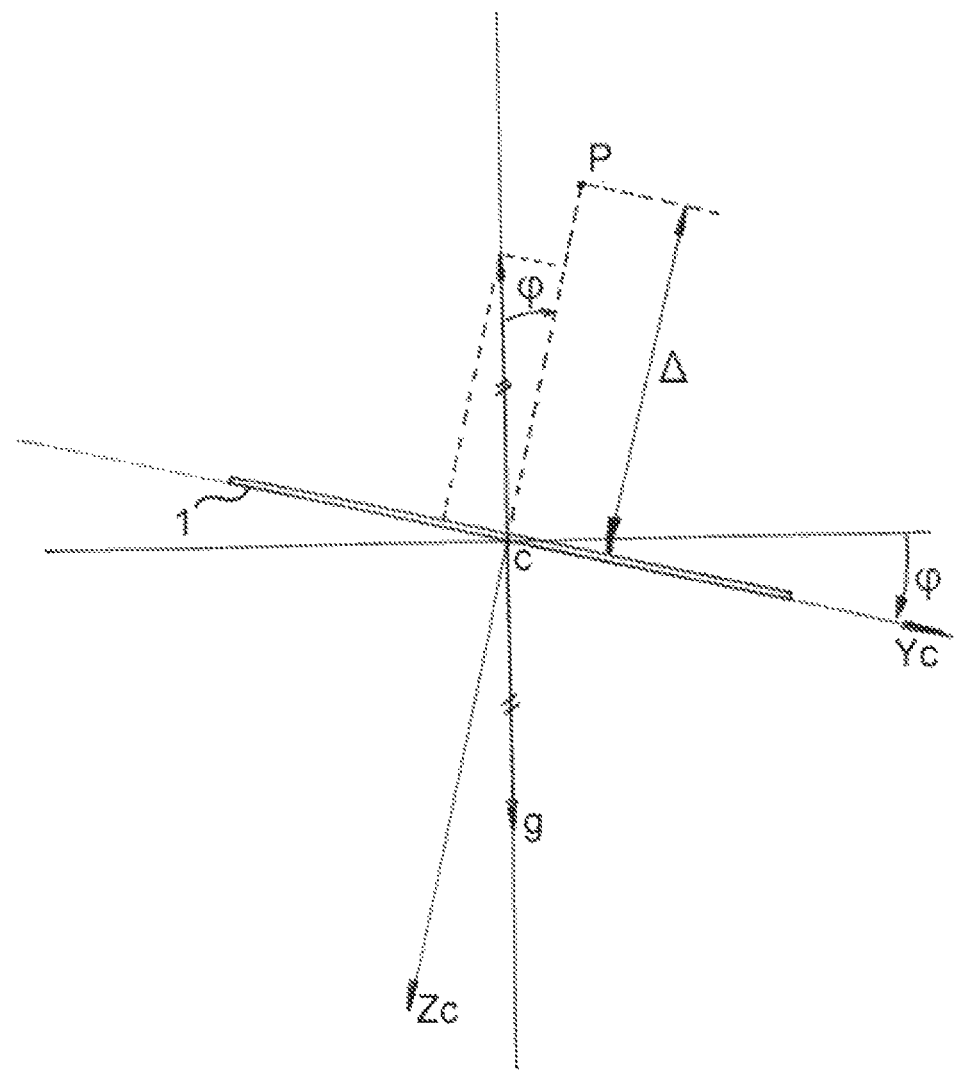

FIG. 5: Specific force in y-direction at a point P of a moving platform
  1: moving platform
FIG. 6: Aircraft time history for a step in aileron
  6.1: aileron input (°)
  6.2: roll rate (°/sec)
  6.3: roll acceleration (°/sec$^2$)

Figure 7:
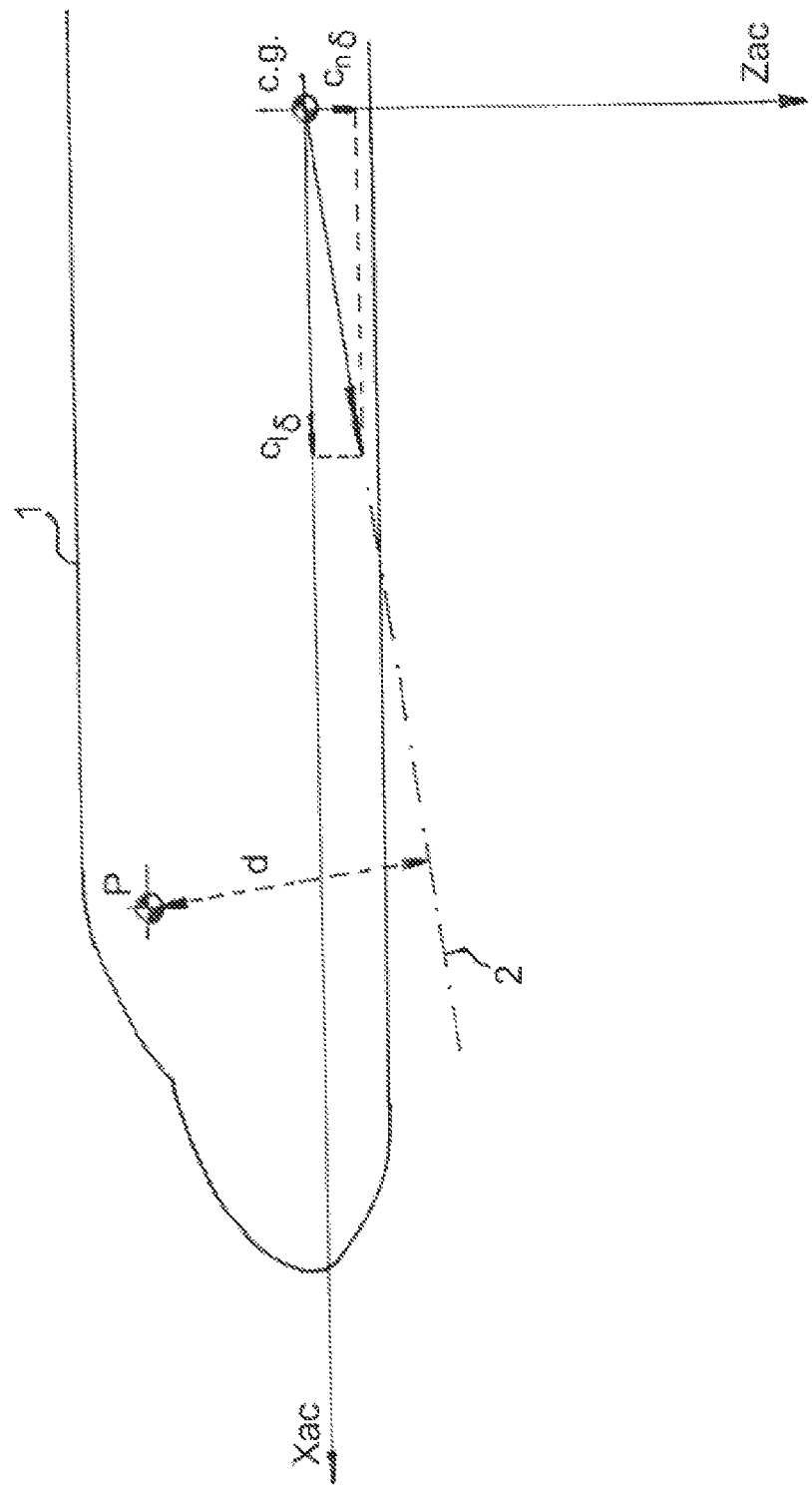
Figure 8:
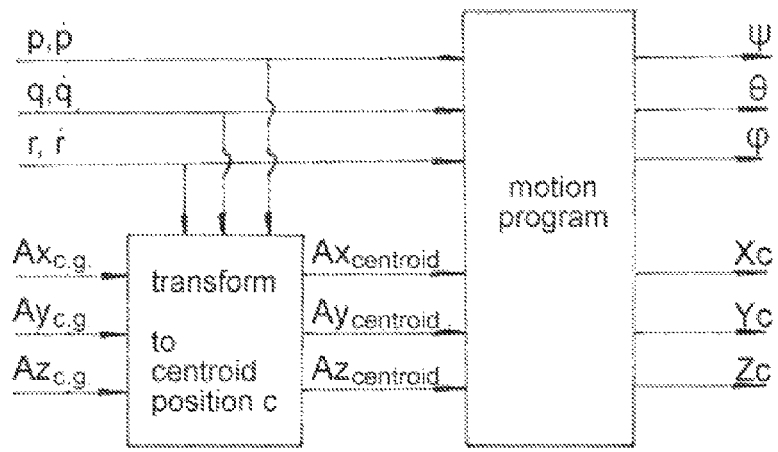
Figure 10:
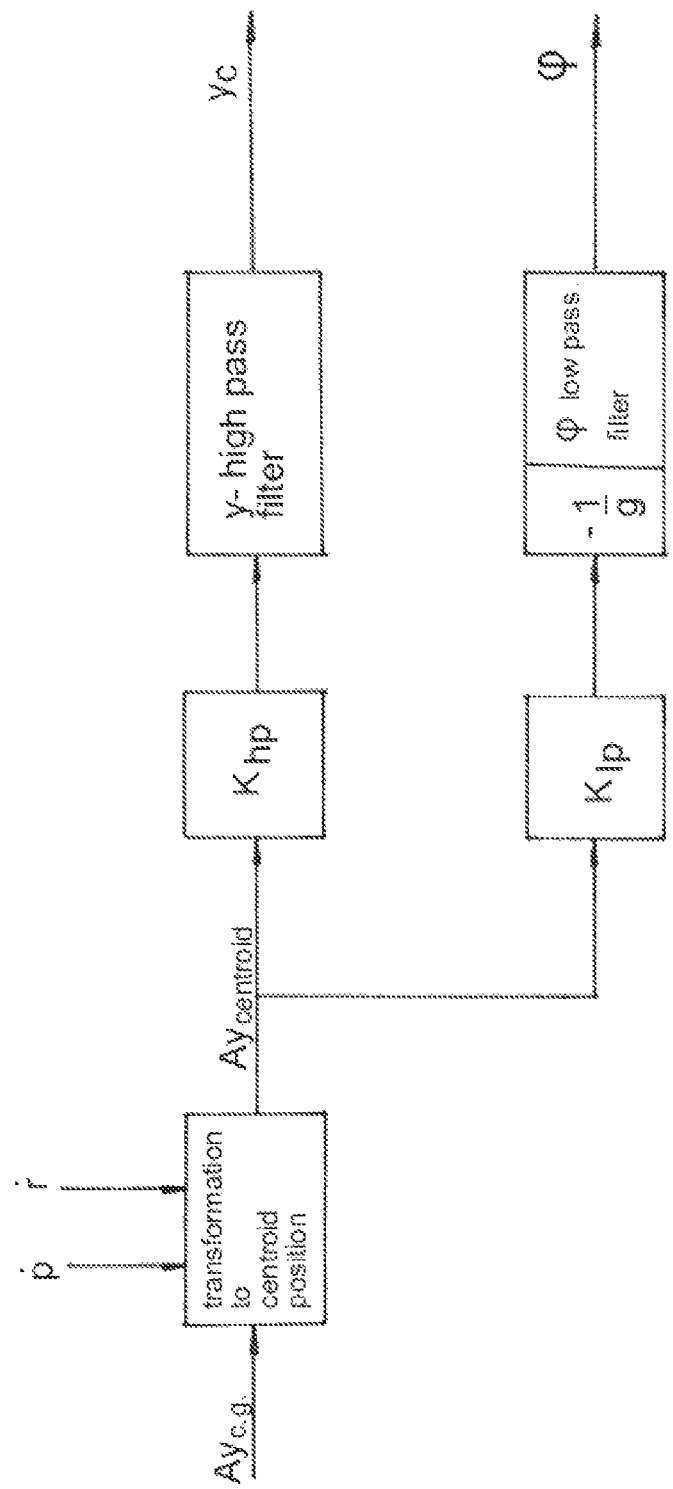
Figure 11:
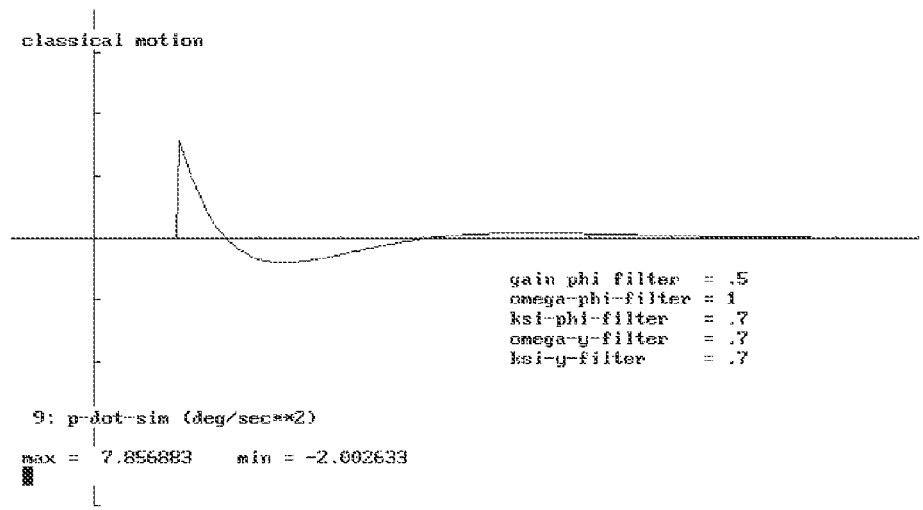
Figure 11:
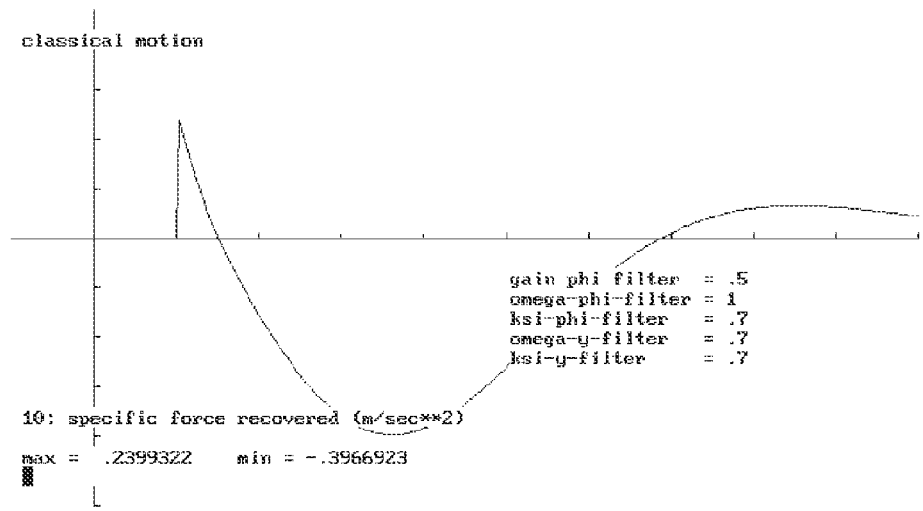

FIG. 7: Instantaneous roll axis due to aileron input
  1: aircraft
  2: instantaneous roll axis
FIG. 8: Flowchart "classic" transformations
FIG. 9: Classic filters, roll channel
FIG. 10: Classic filters, lateral specific forces channel
FIG. 11: Flight simulator time histories classic filters
  11.1: lateral position centroid (m)
  11.2: lateral acceleration centroid (m/sec$^2$)
  11.3: roll angle (°)
  11.4: roll acceleration (°/sec$^2$)
  11.5: specific force Ay-p (m/sec$^2$)
FIG. 12: Flowchart "corrected" transformations in accordance with an embodiment of the present invention
FIG. 13: Roll channel with introduction of φ-cor in accordance with an embodiment of the present invention
FIG. 14: Lateral specific forces channel with Ay decomposition and complementary filters in accordance with an embodiment of the present invention
  1: complementary filters, Ay-pilot due to roll acceleration
  2: complementary filters, Ay-pilot due to yaw acceleration
FIG. 15: Flight simulator time histories using "φ-cor feed-forward" in accordance with an embodiment of the present invention
  15.1: lateral position point P (m)
  15.2: lateral acceleration point P (m/sec$^2$)
  15.3: roll angle (°)
  15.4: roll acceleration (°/sec$^2$)
  15.5: specific force Ay-p (m/sec$^2$)
FIG. 16: Flight simulator time histories complete new concept, Ky=1, in accordance with an embodiment of the present invention
  16.1: lateral position point P (m)
  16.2: lateral acceleration point P (m/sec$^2$)
  16.3: roll angle (°)
  16.4: roll acceleration (°/sec$^2$)
  16.5: specific force Ay-p (m/sec$^2$)
FIG. 17: Flight simulator time histories complete new concept, Ky=0.8, in accordance with an embodiment of the present invention
  17.1: lateral position point P (m)
  17.2: lateral acceleration point P (m/sec$^2$)
  17.3: roll angle (°)
  17.4: roll acceleration (°/sec$^2$)
  17.5: specific force Ay-p (m/sec$^2$)
FIG. 18: Example of roll rate limiting function in accordance with an embodiment of the present invention
FIG. 19: illustration of a computer system for use with the present invention
FIG. 20: illustration of a flight simulator

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

DEFINITIONS AND ANNOTATIONS

The following terms are provided solely to aid in the understanding of the invention. These definitions should not be construed to have a scope less than understood by a person of ordinary skill in the art.

a/c aircraft
A direction cosines matrix
Ax specific force x-component
Ay specific force y-component
Az specific force z-component
Ay-centroid Ay at hypothetical centroid location with respect to a/c ref. system
Ay-cg Ay at a/c c.g.
Ay-pilot Ay pilot with respect to a/c reference system
Ay-p Ay at pilots' reference point P in the simulator
c centroid, geometrical centre of gravity of moving platform
c.g. centre of gravity
d distance between P and roll angular acceleration axis
g earth gravity, 9.81 m/sec$^2$
k gain
Kd down tuning gain roll channel
Kp down tuning gain Ay channel, roll input
Kr down tuning gain Ay channel, yaw input
Khp down tuning gain classic y high pass filter
Klp down tuning gain classic $\phi$ low pass filter
Ky gain lateral co-ordination
p roll rate
P Laplace operator (means: d/dt); pilots' reference point
p-lim roll rate limit
p-ltd limited roll rate
q pitch rate
r yaw rate
r-lim yaw rate limit
r-ltd limited yaw rate
xc-ac x-co-ordinate centroid in a/c reference system
zc-ac z-co-ordinate centroid in a/c reference system
xp-ac x-co-ordinate P in a/c reference system
zp-ac z-co-ordinate P in a/c reference system
xp-c x-co-ordinate P in moving platform system
zp-c z-co-ordinate P in moving platform system
y y-co-ordinate
y-c y-co-ordinate centroid in fixed platform reference system
y-p y-co-ordinate pilots'-reference point P in fixed platform reference system
$\delta$ aileron control wheel deflection (deg)
$\psi$ yaw angle
$\theta$ pitch attitude
$\phi$ roll angle
$\phi$-hp roll angle high pass filter
$\phi$-cor roll angle correction new concept
$\Delta$ vertical distance between pilots' reference point P and platform centroid c
$\tau$ time constant (sec)
$\omega$ circular frequency (rad/sec)
$\xi$ damping ratio
$c_n$ yawmoment coefficient
$c_l$ rollmoment coefficient $$c_{n\delta} = \frac{\partial c_n}{\partial \delta}$$

$$c_{l\delta} = \frac{\partial c_l}{\partial \delta}$$

$\dot{\alpha}$ d/dt ($\alpha$)=first derivative of parameter ($\alpha$) with respect to time
$\ddot{\alpha}$ d$^2$/dt$^2$ ($\alpha$)=second derivative of parameter ($\alpha$) with respect to time

REFERENCE SYSTEMS

All reference systems are right-handed, x pointing forwards, y to the right and z downwards.

Figure 1:
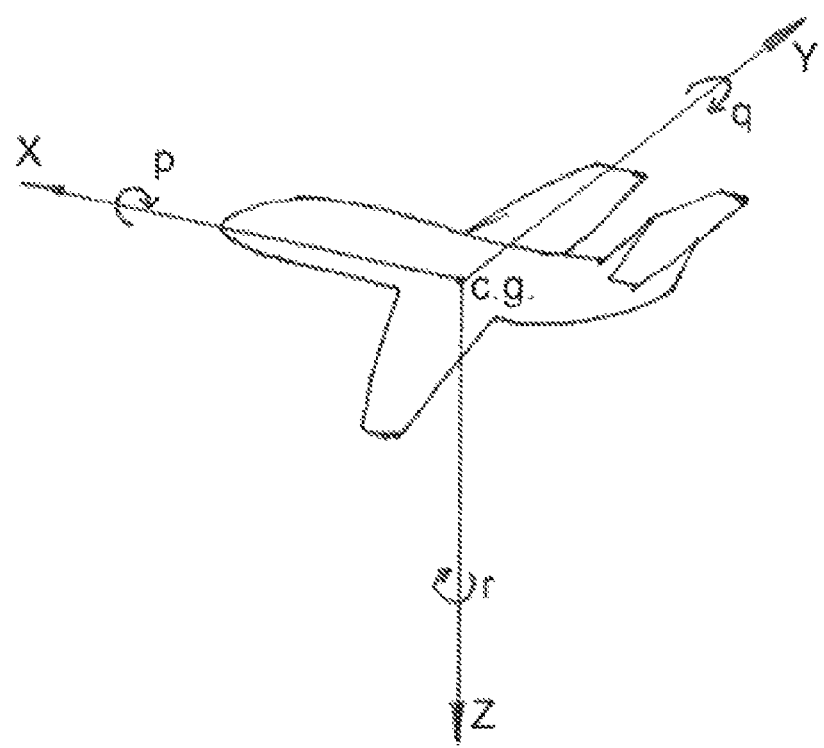
FIG. 1: aircraft reference system
Figure 2:
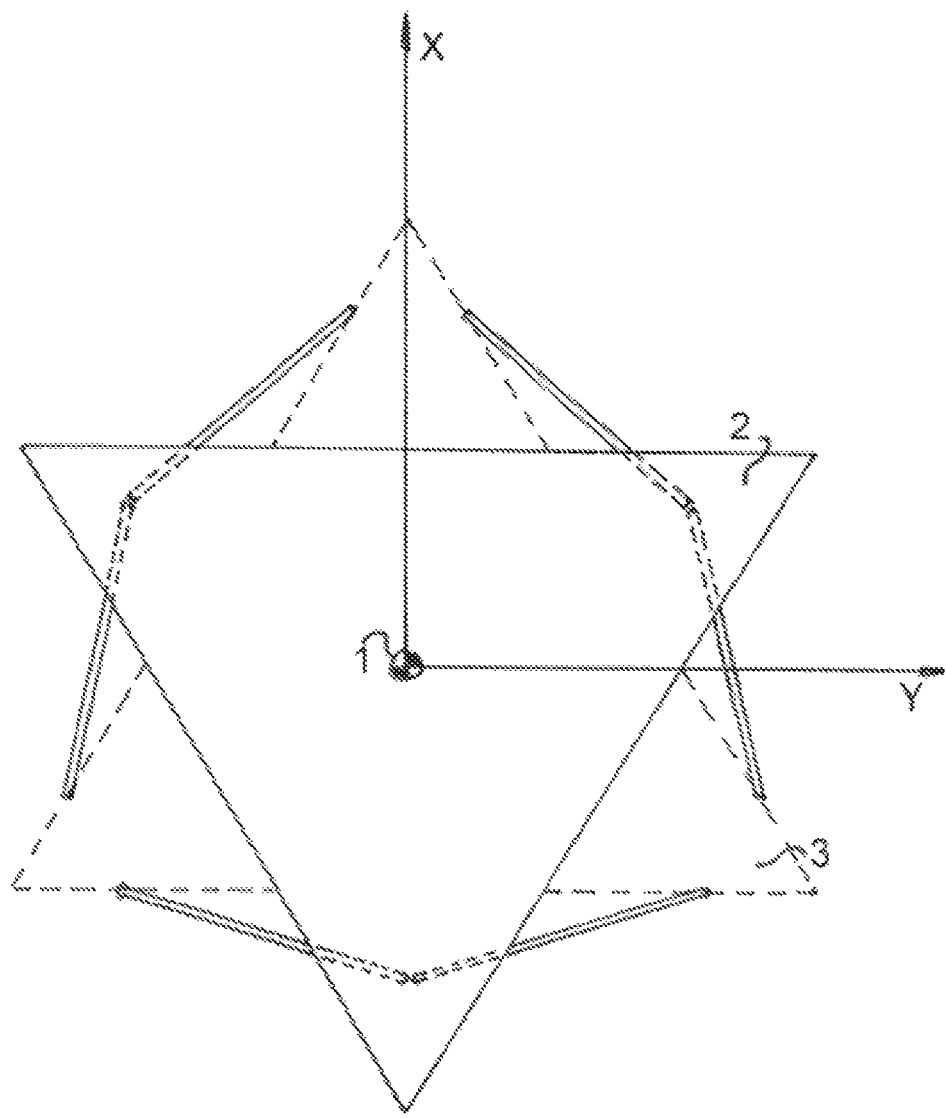
FIG. 2: fixed platform of simulator reference system
  1: centroid of the simulator
  2: upper motion platform
  3: lower motion platform
Figure 3:
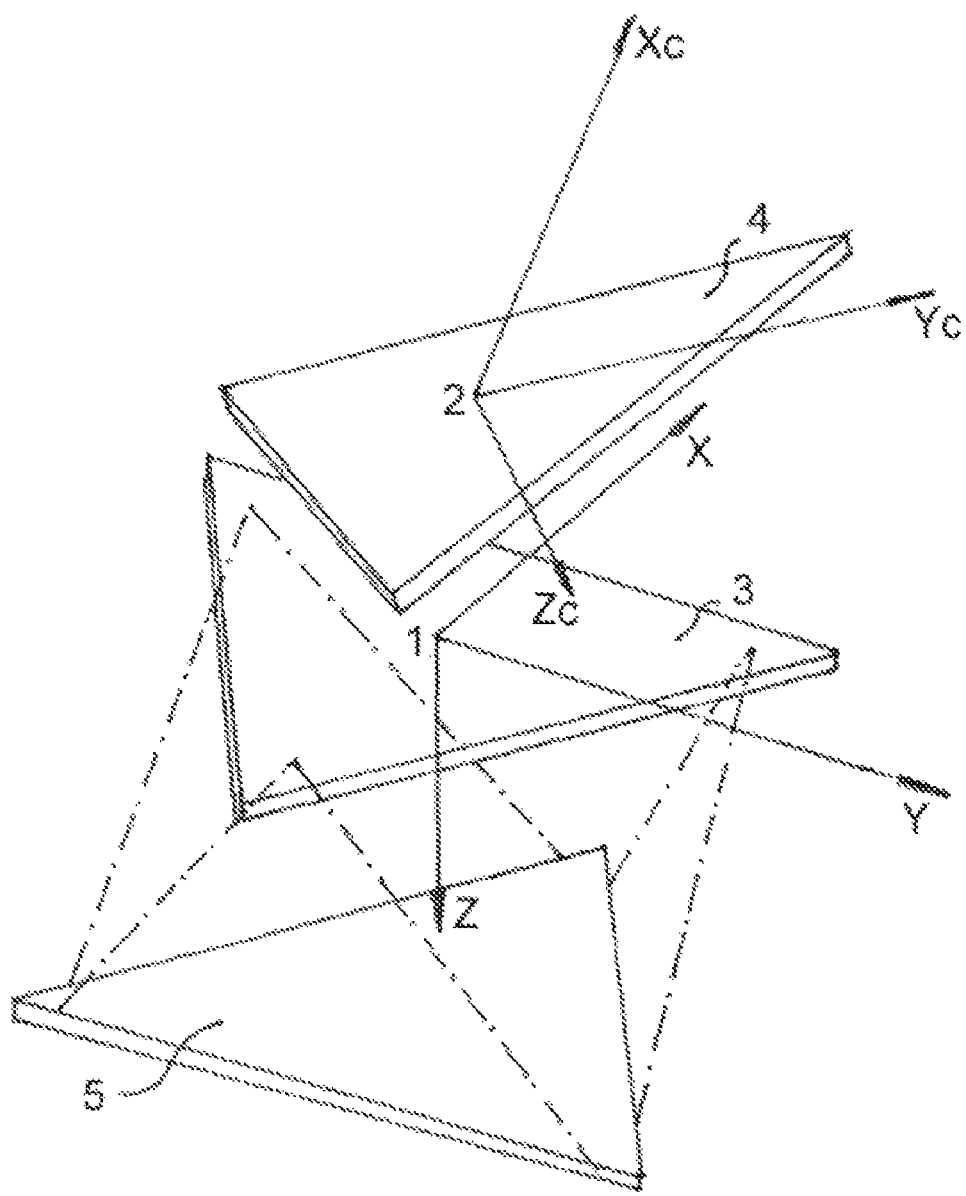
FIG. 3: moving platform reference system
  1: initial centroid position
  2: moving centroid
  3: upper motion platform at rest
  4: upper motion platform, moving
  5: lower motion platform
Figure 4:
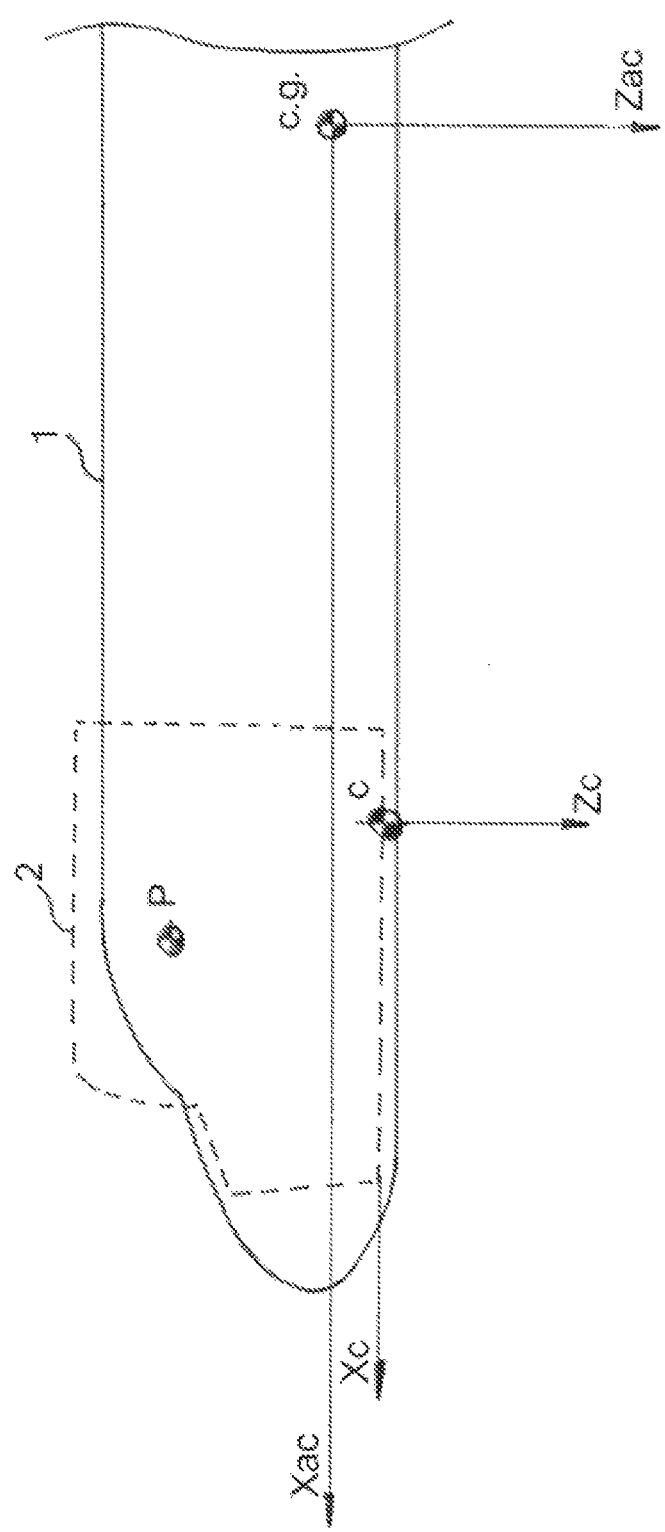
FIG. 4: Pilots' reference point—platform centroid—aircraft centre of gravity (c.g.)
  1: aircraft
  2: hypothetical location simulator
  P: pilots' reference point
  c: centroid
  c.g.: centre of gravity
  co-ordinates pilots' reference point with respect to aircraft c.g.

In FIG. 1 a aircraft reference system is illustrated having its origin at a fixed point, e.g. in centre of gravity. In FIG. 2 a fixed platform reference system is illustrated having its origin at an initial position of the centroid. FIG. 3 shows a moving platform reference system having its origin at the centroid.
Pilots' Reference Point P (FIG. 4)

Point where the motion perception is assumed to take place. Motion is perceived through the semicircular canals of the inner ear. However there is also tactile motion perception (also called "seat of the pants"). Therefore the point P is assumed to be located in between the 2 pilots at a height halfway between their head and seat cushion. In a typical flight simulator the distance $\Delta$ between the pilot's reference point P and the centroid c of the simulator is 1.00 to 1.75 m.
Specific Force (m/sec$^2$)

Specific force in a given direction is equal to the linear acceleration which would be measured by a linear accelerometer in that direction. It is equal to the vectorial difference between kinematical acceleration and acceleration due to gravity. Specific force at a given point P (Ay-p) on a moving platform is composed out of 3 components: centroid acceleration (ÿ-c), acceleration due to angular acceleration and gravity component:

$$Ay\text{-}p = \ddot{y}\text{-}c + \Delta * \ddot{\phi} - g * \phi$$

Aircraft Model in Flight

A first order approximation is used according to H. Wittenberg, Technische Hogeschool Delft, "Elementaire beschouwing over de samenhang tussen besturing, stabiliteit en demping bij vliegtuigen", Memorandum M-319, October 1979, p. 5-7) with the following transfer function:

$$\left[\frac{p}{\delta}\right] = \frac{k}{P + \frac{1}{\tau_{ac}}}$$

This is a good approximation for the simulation of co-ordinated turns (no specific y-force at the aircraft c.g.).

FIG. 6 shows the aircraft response for an aileron step for a B737-300 aircraft in approach configuration, $\tau_{ac}$=0.67 sec.

It is to be noted that all time histories were computed for a 10 seconds period.

Roll rate (FIG. 6.2) asymptotically approaches its end value while roll acceleration (FIG. 6.3) shows an initial peak value damping out to zero.

It should be noted that the lateral specific force at the pilots' reference point P exhibits exactly the same characteristics as the roll acceleration from FIG. 6.3: if xp-ac and zp-ac are the co-ordinates of the point P (FIG. 4) in the a/c reference system, then it can be shown according to O. H. Gerlach, Technische Hogeschool Delft, "Vliegeigenschappen 1", Dictaat D 26, October-November 1981 p. 227

$$A_{ypilot} = A_{y_{cg}} + (pq+\dot{r}) \cdot xp_{ac} + (rq-\dot{p}) \cdot zp_{ac}$$

For small angular rates:

$$A_{ypilot} = A_{y_{cg}} + \dot{r} \cdot xp_{ac} - \dot{p} \cdot zp_{ac}$$

The lateral specific force as a result of roll angular acceleration is:

$$A_{ypilot} = -\dot{p} \cdot zp_{ac}$$

It is to be noted that if one assumes that aileron not only induces rolling but also yawing moment then $\dot{r} \neq 0$. In that case the lever distance d for the computation of lateral specific force due to angular acceleration can be estimated as follows (FIG. 7):

$$d \cong -zp_{ac} + \frac{c_{n\delta}}{c_{l\delta}} \cdot xp_{ac}$$

If $c_{n\delta}$ and $c_{l\delta}$ are known (e.g. as a function of angle of attack) then this value can be used instead of zp-ac.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

Figure 20:

The simulator platform may be of well-known conventional design. An embodiment of such simulator platform is illustrated in FIG. 20. The present invention is also applicable to any design with at least the following two degrees of freedom: lateral displacement (sway) and roll angle. Only its controlling is adapted in accordance with embodiments of the present invention.

Figure 12:
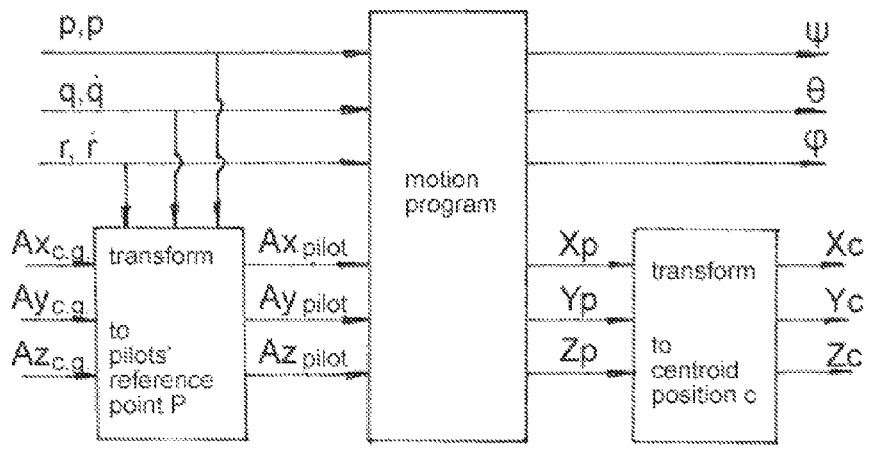
Figure 13:
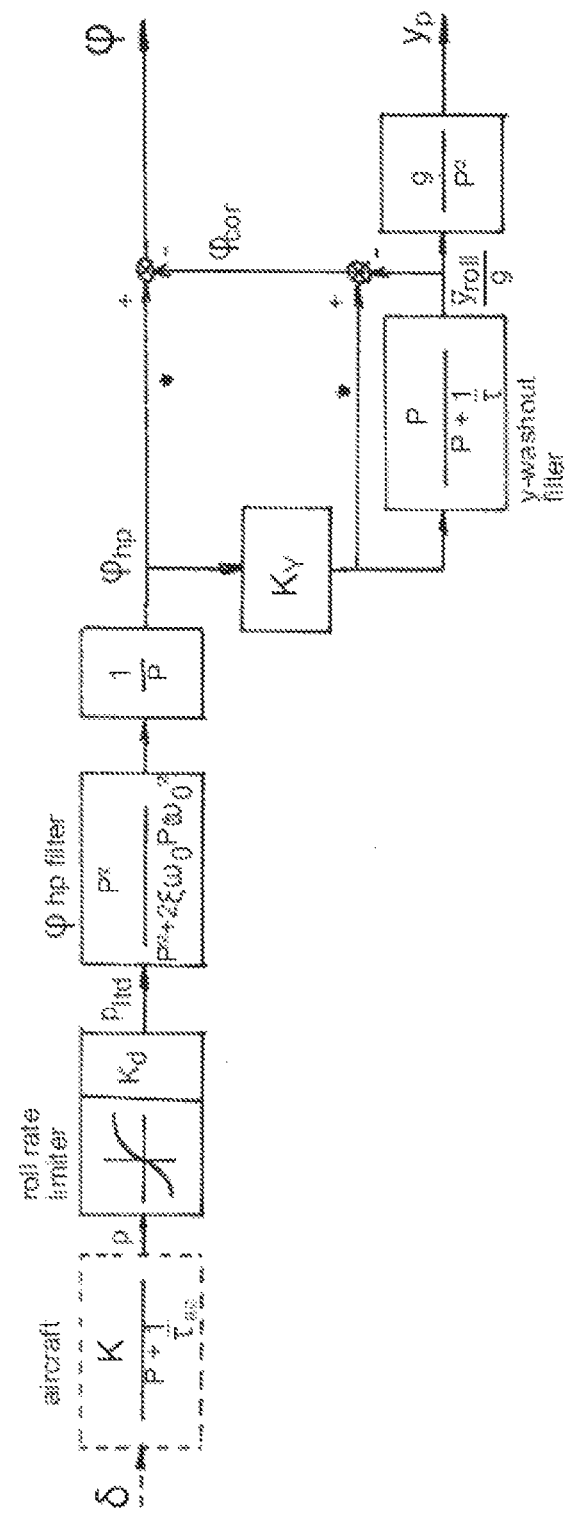
Figure 14:
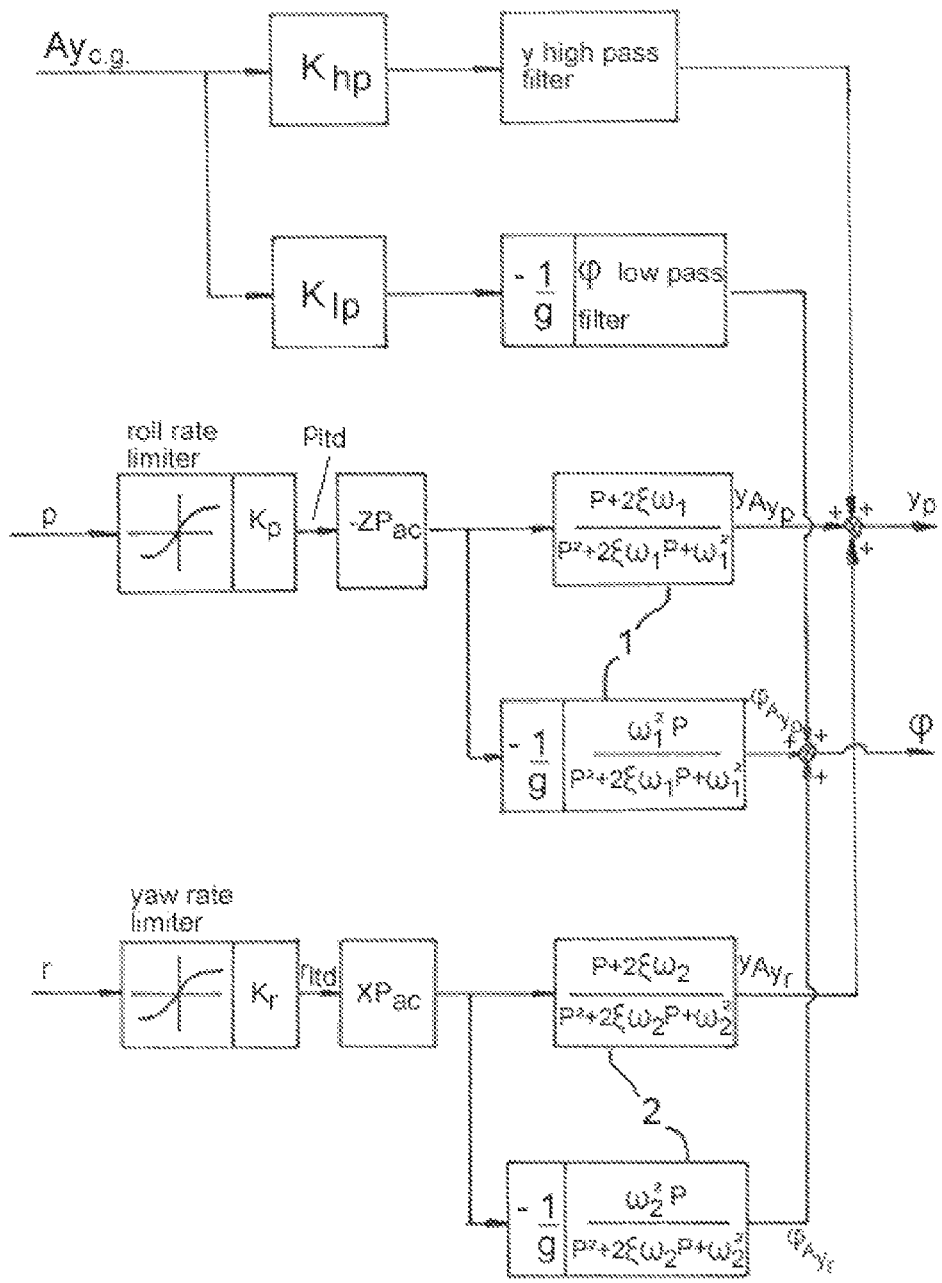

The new motion concept in accordance with embodiments of the present invention is based upon any of three fundamental alterations, or a combination thereof:

1°/FIG. 12: correct centroid transformations
2°/FIG. 13: introduction of φ-cor in the roll channel
3°/FIG. 14: decomposition of Ay and addition of complementary filters Correct Centroid Transformations, FIG. 12

The previously discussed centroid transformation (in "Background of invention") holds a major error. Since the motions of the platform are filtered motions of the centroid c, and as the pilots' reference point P is not situated in the centroid c, spurious accelerations are created at the pilot's reference point P through the combination of platform angular accelerations and the distance in x and z direction between centroid c and pilot's reference point P.

Therefore, in accordance with an embodiment of the present invention, the improved transformations are as follows:

1°/One should not compute the specific forces in the a/c at the hypothetical centroid location c (as in FIG. 8) but rather at the pilots' reference point P (FIG. 12):

$$A_{xpilot} = A_{x_{cg}} - (q^2+r^2) \cdot xp_{ac} + (pr+\dot{q}) \cdot zp_{ac}$$

$$A_{ypilot} = A_{y_{cg}} + (pq+\dot{r}) \cdot xp_{ac} + (qr-\dot{p}) \cdot zp_{ac}$$

$$A_{zpilot} = A_{z_{cg}} + (pr-\dot{q}) \cdot xp_{ac} - (p^2+q^2) \cdot zp_{ac}$$

2°/These signals are to be used together with the angular rates as input for the simulator motion program.

3°/The three position output signals from the motion program $$\begin{bmatrix} x \\ y \\ z \end{bmatrix}_P$$

are to be considered as the commanded position of the pilots' reference point P. They should be transformed towards commanded positions of the centroid as follows:

Let the co-ordinates of the pilots' reference point P with respect to the moving platform reference system be:

$$\begin{bmatrix} xp_c \\ 0 \\ zp_c \end{bmatrix}$$

The following relation holds between the fixed platform reference system co-ordinates of P and c according to Filip Van Biervliet, Technische Hogeschool Delft, "Ontwerp en evaluatie van stuurcommandosysteem-regelwetten met de quickened display methode", bijlage 2 Ingenieursverslag, maart 1982:

$$\begin{bmatrix} x \\ y \\ z \end{bmatrix}_P = \begin{bmatrix} x \\ y \\ z \end{bmatrix}_c + A \cdot \begin{bmatrix} xp_c \\ 0 \\ zp_c \end{bmatrix}$$

While A=direction cosines matrix $$A = \begin{bmatrix} \cos\theta\cos\psi & \sin\varphi\sin\theta\cos\psi - \cos\varphi\sin\psi & \cos\varphi\sin\theta\cos\psi + \sin\varphi\sin\psi \\ \cos\theta\sin\psi & \sin\varphi\sin\theta\sin\psi + \cos\varphi\cos\psi & \cos\varphi\sin\theta\sin\psi - \sin\varphi\cos\psi \\ -\sin\theta & \sin\varphi\cos\theta & \cos\varphi \cdot \cos\theta \end{bmatrix}$$

As a result:

$$\begin{bmatrix} x \\ y \\ z \end{bmatrix}_c = \begin{bmatrix} x \\ y \\ z \end{bmatrix}_P - A \cdot \begin{bmatrix} xp_c \\ 0 \\ zp_c \end{bmatrix}$$

In y-direction:

$$y_c = y_P - \cos\theta \sin\psi \cdot xp_c - (\cos\varphi \sin\theta \sin\psi - \sin\varphi \cos\psi) \cdot zp_c$$

Taking only into account the influence of zp-c, and assuming small values of $\psi$, $\theta$ and $\varphi$:

$$y_c = y_P - zp_c \cdot \varphi$$

$$y_c = y_P - \Delta \cdot \varphi$$

Introduction of φ-Cor in Roll Channel, FIG. 13

Figure 9:
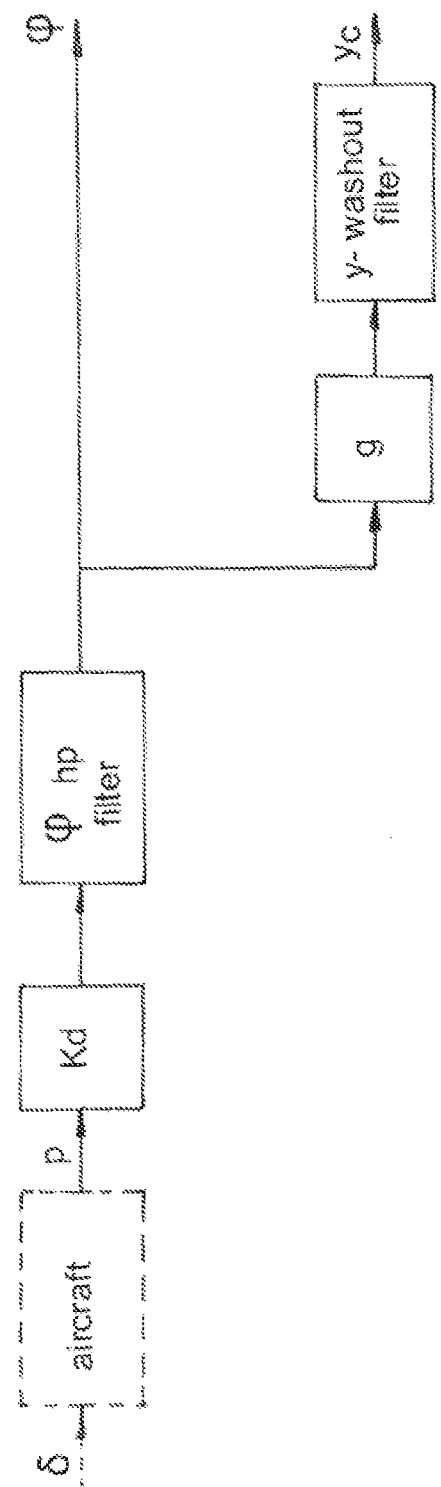

Consider FIG. 13 in comparison with FIG. 9. This arrangement of filters is designed to simulate angular roll accelerations with reduced or no spurious lateral specific forces, in accordance with an embodiment of the present invention.

The innovative thing about this schematic is the feed-forward of a roll angle correction φ-cor to the roll channel. The roll angle correction φ-cor is proportional to the spurious lateral specific force induced by the y-washout filter. It is a low frequency signal. From a physical point of view it means that the platform is being tilted back proportionally to its linear deceleration (Very much the same way a waiter has to tilt back his serve tray in order not to loose his drinks when he is suddenly forced to stop).

The lateral co-ordination factor Ky (between 0 and 1) is meant to reduce the lateral sway of the simulator.

It follows from the scheme $$A_y = \ddot{y}_{roll} - g \cdot \varphi_{roll}$$
$$= \ddot{y}_{roll} - g \cdot (\varphi_{hp} - \varphi_{cor})$$
$$= \ddot{y}_{roll} - g \cdot \left(\varphi_{hp} + \frac{1}{g} \cdot \ddot{y}_{roll} - K_y \cdot \varphi_{hp}\right)$$
$$= -g \cdot (1 - K_y) \cdot \varphi_{hp}$$

This means that if the gain lateral co-ordination Ky=1 then the y component of the specific force Ay=0, which means perfect co-ordination.

Figure 15:
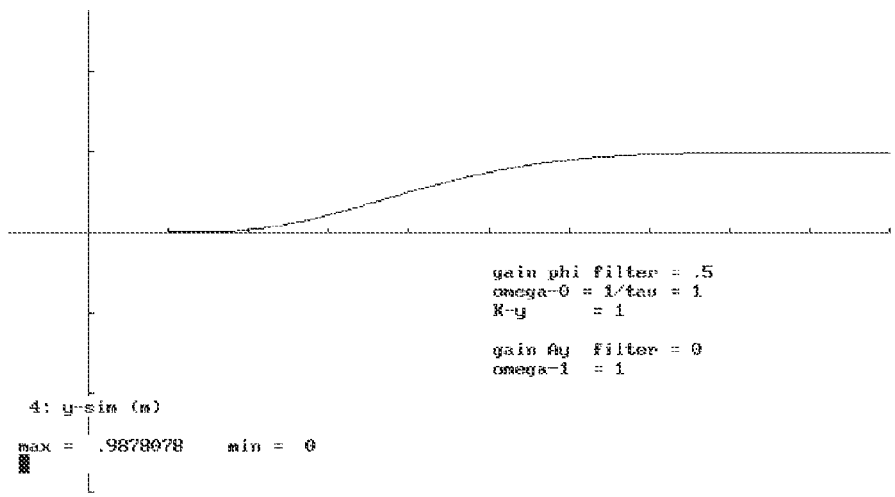
Figure 15:
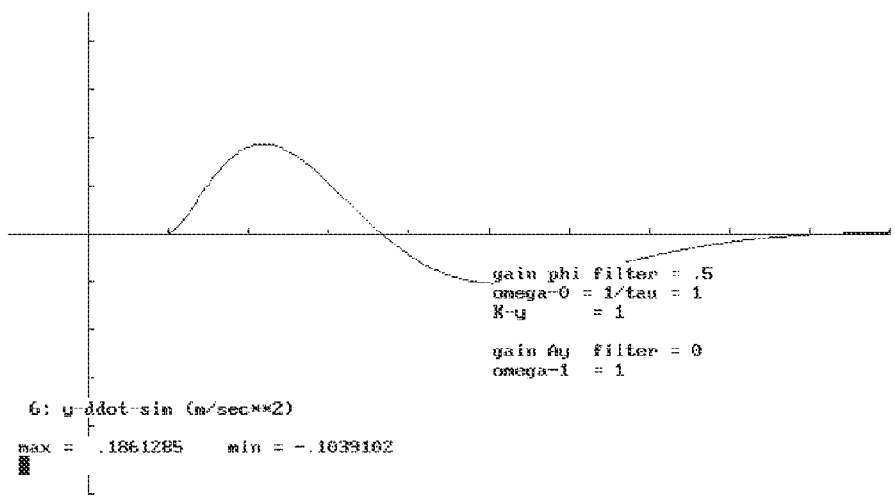
Figure 15:
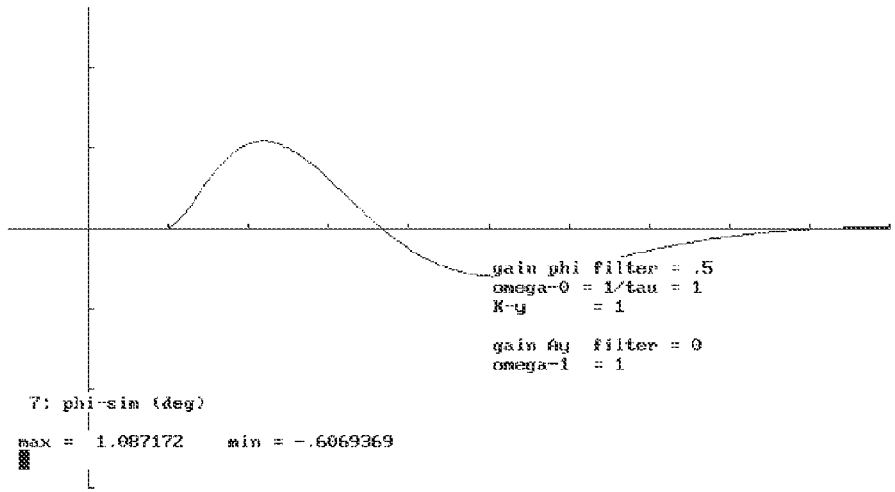
Figure 15:
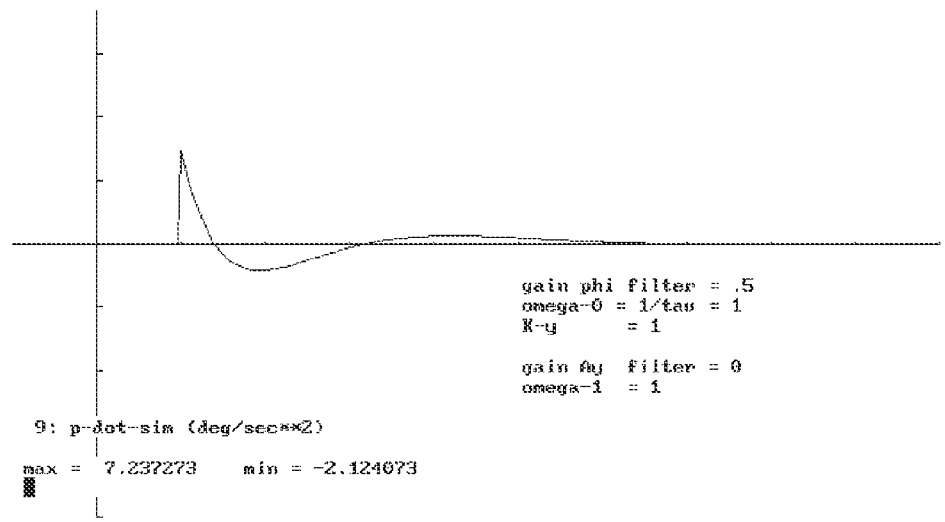
Figure 15:
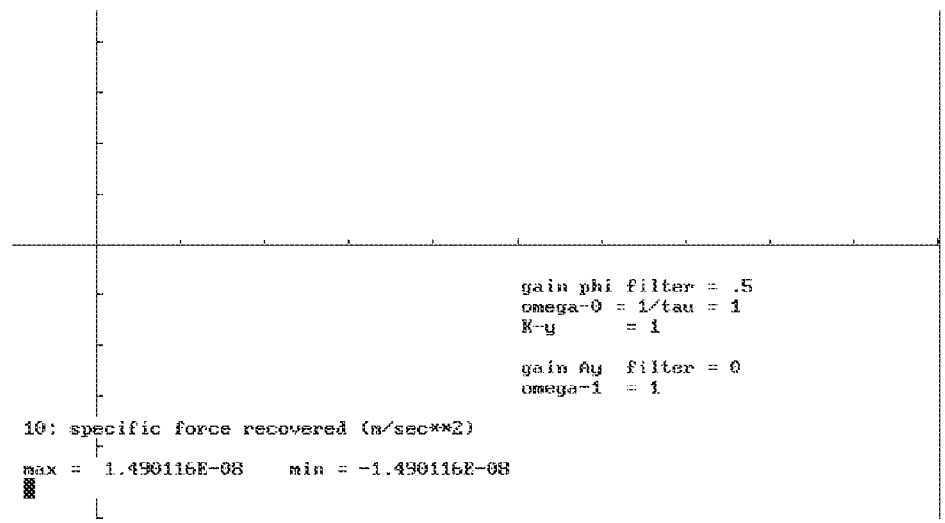

A time response is shown in FIG. 15 for Ky=1. It clearly shows that Ay=0. However it can also be seen that there is slightly more distortion in angular roll acceleration (compare FIG. 11.4 and FIG. 15.4).

If Ky=1 it is evident that the two signal paths in FIG. 13 which are highlighted with an asterisk *, cancel each other. This means that the total φ filter can be reduced to the φ-hp filter in series with the y-washout filter.

This is also the reason why the y-washout filter is preferably chosen to be of $1^{st}$ order and not of $2^{nd}$ or higher order. This way the total filter is $3^{rd}$ order and not $4^{th}$ order. Total φ filter of $4^{th}$ or higher order would have resulted in even more distortion of roll angular acceleration.

Reducing Ky to 0.7 or 0.8 decreases lateral co-ordination; however it also leads to less distortion of roll angular acceleration.

It can be shown using the 'end value' theorem of Laplace that for a step response $$\lim_{t \to \infty} \frac{y_{roll}}{p_{ltd}} = K_y \cdot g \cdot \frac{1}{\omega_0^2 \cdot \frac{1}{\tau}}$$

This means that a constant roll rate (from constant aileron input) leads to a constant displacement of the simulator. If the total filter order, sum of φ-hp and y-washout filters, had been of $4^{th}$ or higher order, then $$\lim_{t \to \infty} \frac{y_{roll}}{p_{ltd}} = 0$$

So a second advantage of choosing a $3^{rd}$ order total filter, $2^{nd}$ order φ-hp and $1^{st}$ order y-washout or $1^{st}$ order φ-hp and $2^{nd}$ order y-washout, is that now after a manoeuvre, the simulator is ready to accept the following manoeuvre: aileron back to neutral or opposite.

Decomposition of Ay and Addition of Complementary Filters, FIG. 14

Lateral specific force at the pilot's seat in the aircraft is the sum of lateral specific force of a fixed point of the aircraft, e.g. its centre of gravity, and accelerations due to the position of the pilot in front and above this fixed point, e.g. centre of gravity, according to the formulae given above.

A good approximation for the lateral specific force was already given in the definitions section, where only the acceleration due to angular acceleration was considered:

$$A_{ypilot} = A_{ycg} + \dot{r} \cdot xp_{ac} - \dot{p} \cdot zp_{ac}$$

It can be shown that $2^{nd}$ order complementary filters cannot be used for the total signal or for Ay at c.g. However as the signals p and r (which are integrals of accelerations) are available, they can be used, in accordance with embodiments of the present invention, as input signals to complementary filters of $2^{nd}$ order. This is illustrated in FIG. 14. Only the lateral specific force at the fixed point, e.g. centre of gravity, is still sent through the classic filters.

Complementary means that the sum of their transfer functions equals 1, or in other words the input signal is respected over its complete frequency contents. Onset is given with lateral displacement, lower frequencies through roll angle. For instance for the specific force due to roll acceleration:

$$\left[\frac{y_{A_{yp}}}{\dot{p}_{ltd}}\right] = \frac{-zp_{ac} \cdot (P + 2\xi\omega_1)}{P^2 + 2\xi\omega_1 P + \omega_1^2}$$

$$\left[\frac{\varphi_{A_{yp}}}{\dot{p}_{ltd}}\right] = \frac{zp_{ac}}{g} \frac{\omega_1^2 P}{P^2 + 2\xi\omega_1 P + \omega_1^2}$$

thus:

$$\left[\frac{\ddot{y}_{A_{yp}} - g\varphi_{A_{yp}}}{-zp_{ac} \cdot \dot{p}_{ltd}}\right] = \frac{P^2 + 2\xi\omega_1 p}{P^2 + 2\xi\omega_1 P + \omega_1^2} + \frac{\omega_1^2}{P^2 + 2\xi\omega_1 P + \omega_1^2}$$
$$= 1$$

It is to be noted that $zp_{ac} < 0$ for a classic aircraft.

It can be shown with the 'initial value' theorem of Laplace that $$\lim_{t \to 0} \frac{\varphi_{A_{yp}}}{\dot{p}_{ltd}} = \frac{\omega_1^2 \cdot zp_{ac}}{g}$$

This means that a positive step in a.c. angular acceleration (roll or yaw) leads to a negative step angular roll acceleration response of the simulator. In case of simulating a roll only manoeuvre, the roll acceleration from the specific force simulation decreases the roll acceleration response from the roll circuit FIG. 13. It is therefore important to choose $\omega_1$ as low as possible in order to reduce this effect as much as possible.

Again using the 'end value' theorem of Laplace one finds $$\lim_{t \to \infty} \frac{y_{A_{yp}}}{\dot{p}_{ltd}} = \frac{-2\xi \cdot zp_{ac}}{\omega_1}$$

This means that a given roll or yaw rate will lead to a finite lateral simulator position. A distinct advantage of this method of decomposing the signal and using separate filters is that tuning of those filters can be adapted to typical manoeuvres: The yaw filter can be adapted for taxi and engine failure, the roll filter for co-ordinated turns in combination with the roll angle correction (φ-cor) concept.

It is to be noted that positions and angles from the 'roll channel' (FIG. 13) and the 'Ay specific force filters' (FIG. 14) have to be added to each other to obtain total position and angle. As this is the pilots' reference point P position, it is then preferably, in accordance with embodiments of the present invention, converted to centroid position according to the equation given above (FIG. 12).

Discussion

Roll Manoeuvre

Figure 16:
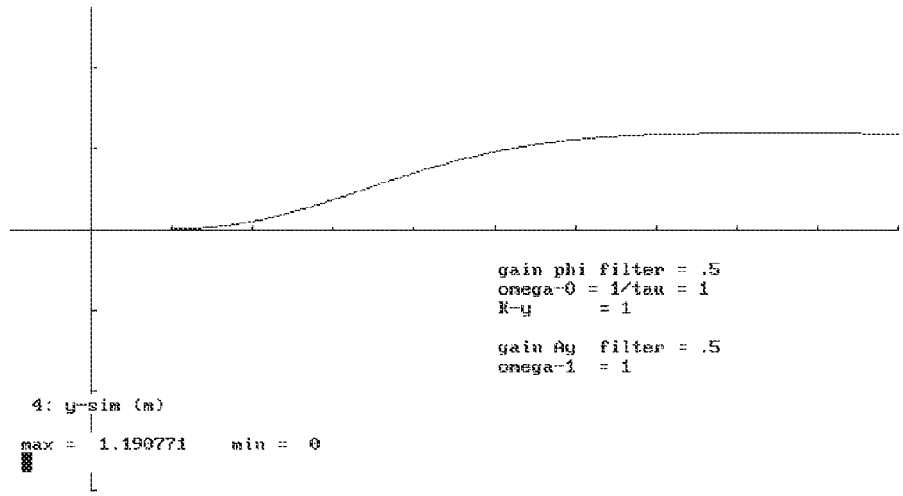
Figure 16:
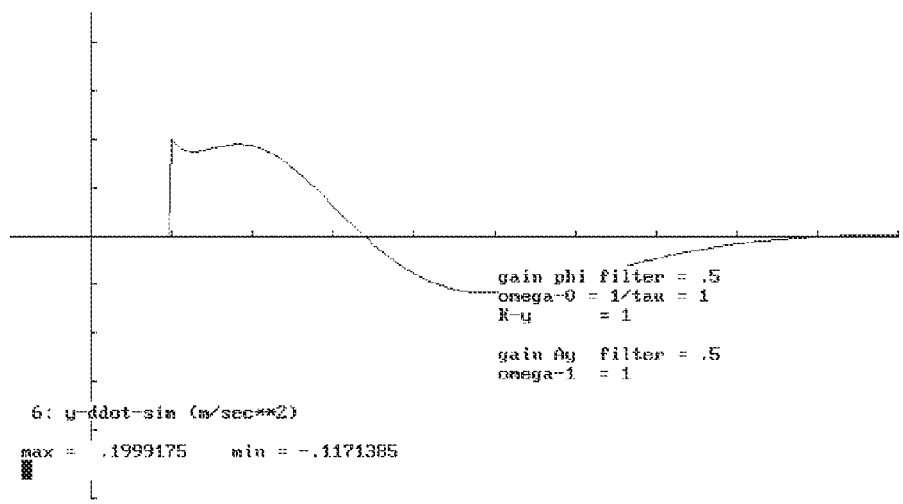
Figure 16:
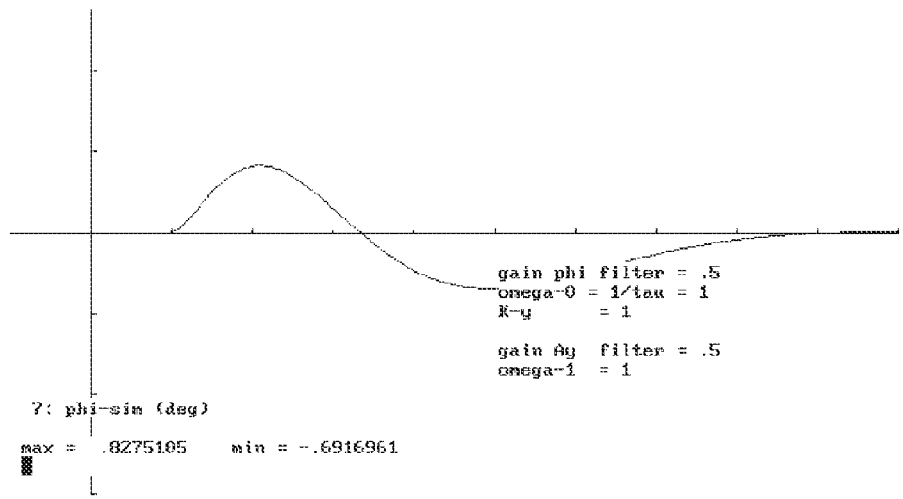
Figure 16:
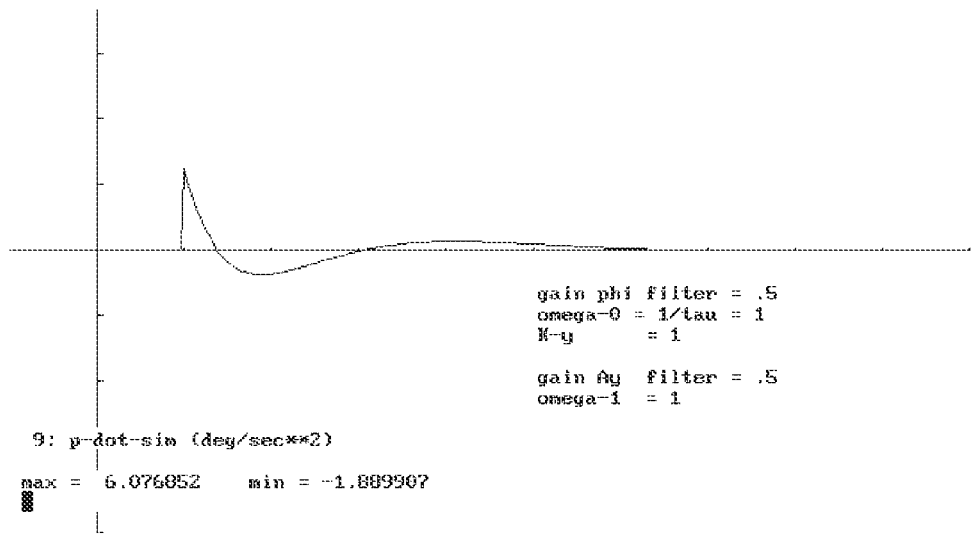
Figure 16:
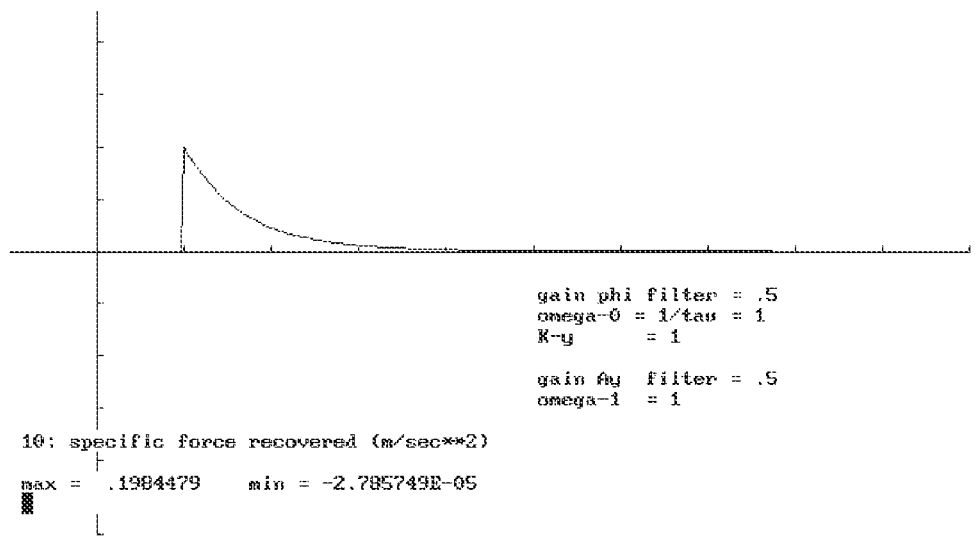
Figure 17:
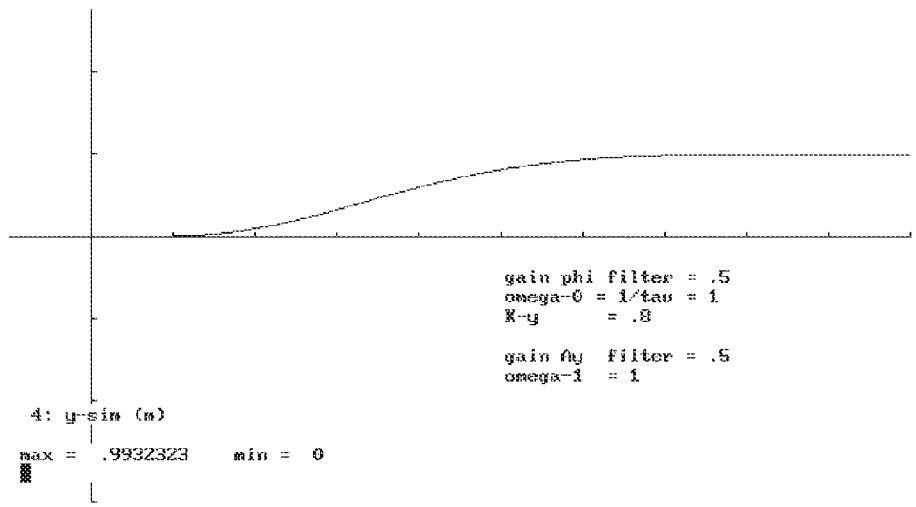
Figure 17:
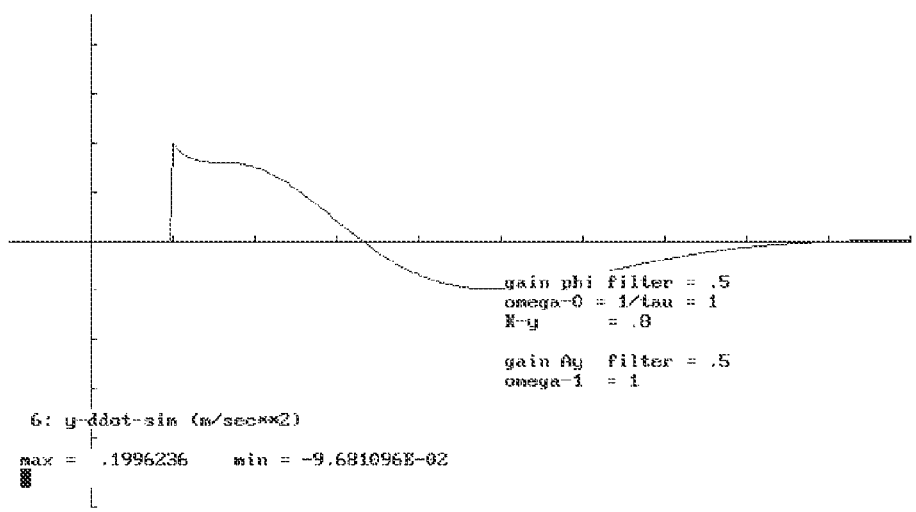
Figure 17:
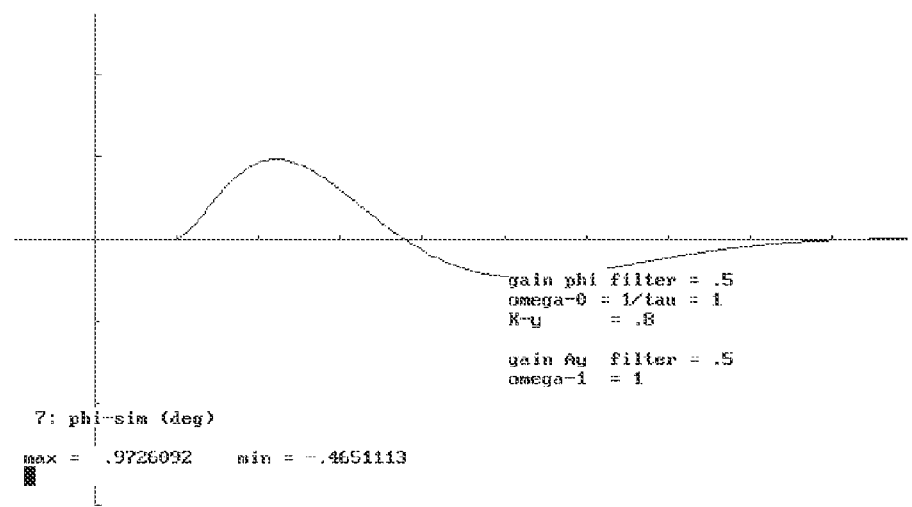
Figure 17:
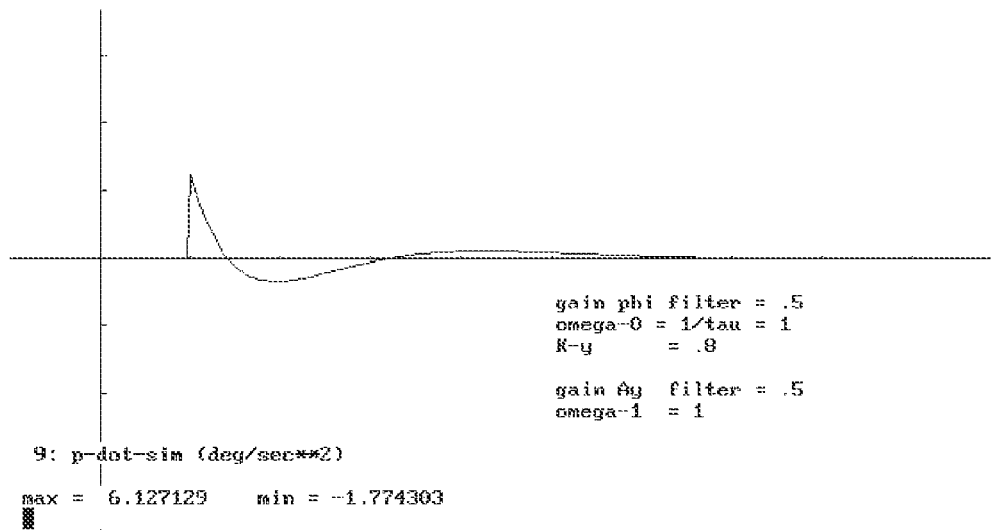
Figure 17:
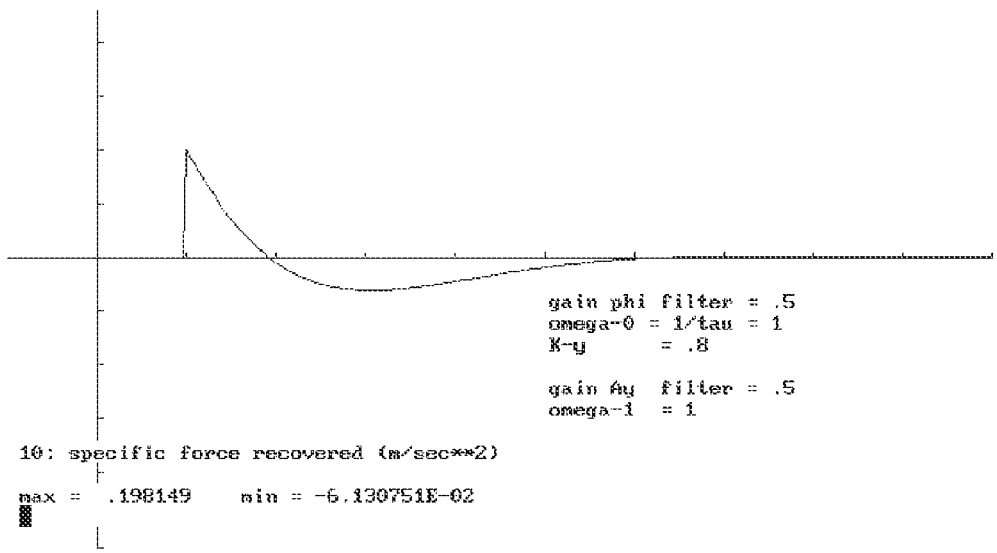
Figure 18:
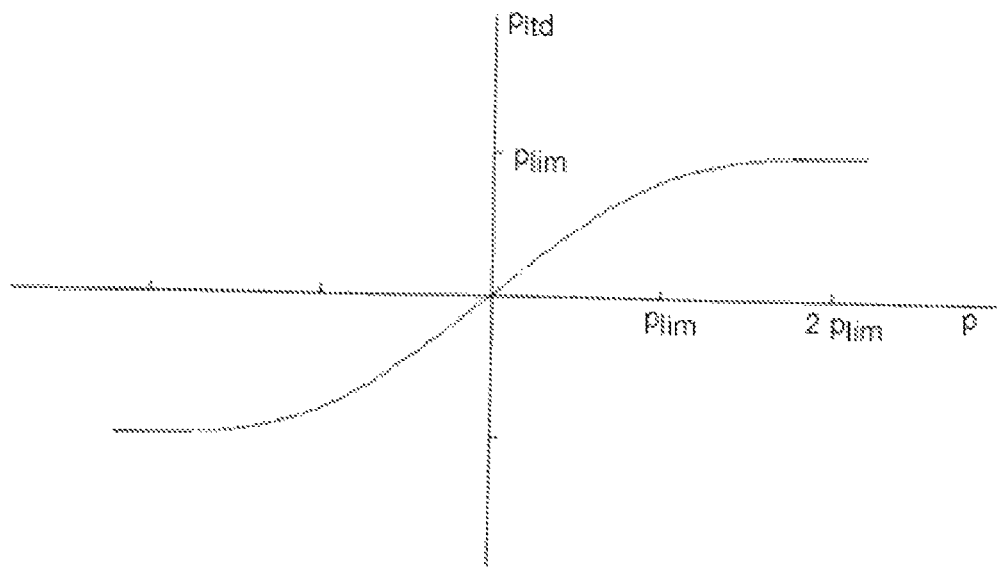

A few time histories according to the complete concept in accordance with an embodiment of the present invention, i.e. combination of correct centroid transformations, introduction of roll angle correction and decomposition of Ay and addition of complementary filters, are given in FIG. 16 and FIG. 17. The maximum lateral travel was selected to be a typical value of 1.20 m. The following observations can be made:

1°/If Ky=1 is selected (FIG. 16), then the lateral specific force perception Ay at the pilots' reference point P in the simulator is exactly proportional (gain Kd) to its value in the aircraft (FIG. 16.5).

2°)/If the selection of Ky is somewhat lower, e.g. Ky=0.8 (FIG. 17), then there is a slight distortion of the Ay signal (FIG. 17.5) while at the same time the required lateral travel diminishes (FIG. 17.1 versus FIG. 16.1) and the response of roll angular acceleration φ slightly improves (FIG. 17.4 versus FIG. 16.4).

In order never to exceed the maximum available travel of the simulator, according to embodiments of the present invention, a rate limiting function can be added (FIG. 18):

$$p_{ltd} = 0.5 \cdot p + \frac{p_{lim}}{\Pi} \cdot \sin\left(\frac{\Pi \cdot p}{2 p_{lim}}\right)$$

if $p > 2 p_{lim}$, then $p_{ltd} = p_{lim}$ if $p < 2 p_{lim}$, then $p_{ltd} = -p_{lim}$ The second derivative with respect to time of this function is continuous.

Ground Taxi Maneuver

There are no time histories included.

Especially at reduced taxi speeds, Ay at cg is of "low frequency nature", i.e. no abrupt changes in side forces on main tires. Therefore, most benefits from this scheme become apparent at such speeds.

Figure 19:
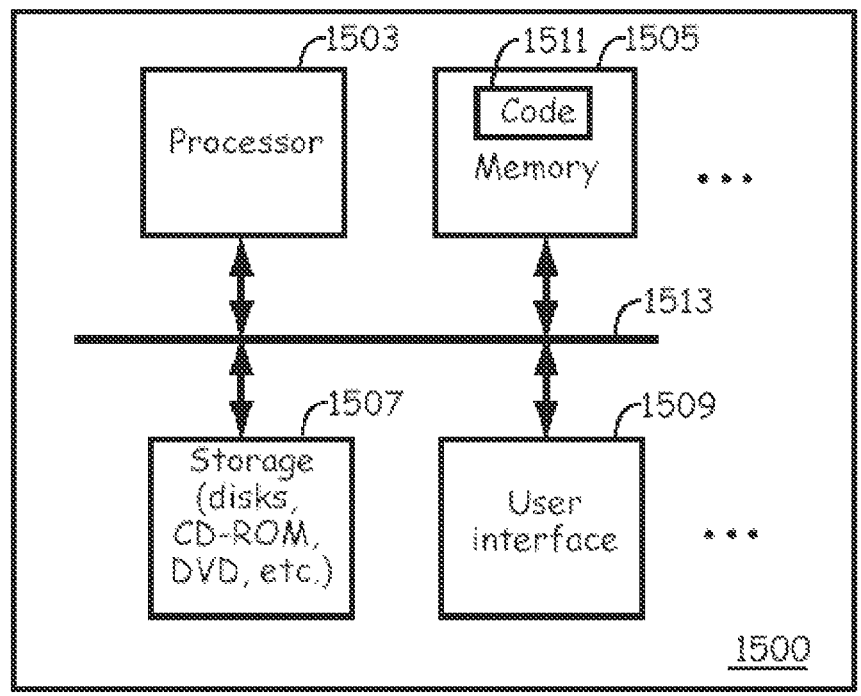

The above-described method embodiments of the present invention may be implemented in a processing system 1500 such as shown in FIG. 19. FIG. 19 shows one configuration of processing system 1500 that includes at least one programmable processor 1503 coupled to a memory subsystem 1505 that includes at least one form of memory, e.g., RAM, ROM, and so forth. A storage subsystem 1507 may be included that has at least one disk drive and/or CD-ROM drive and/or DVD drive. In some implementations, a display system, a keyboard, and a pointing device may be included as part of a user interface subsystem 1509 to provide for a user to manually input information. Ports for inputting and outputting data also may be included. More elements such as network connections, interfaces to various devices, and so forth, may be included, but are not illustrated in FIG. 19. The various elements of the processing system 1500 may be coupled in various ways, including via a bus subsystem 1513 shown in FIG. 19 for simplicity as a single bus, but will be understood to those in the art to include a system of at least one bus. The memory of the memory subsystem 1505 may at some time hold part or all (in either case shown as 1511) of a set of instructions that when executed on the processing system 1500 implement the step(s) of the method embodiments described herein. Thus, while a processing system 1500 such as shown in FIG. 19 is prior art, a system that includes the instructions to implement aspects of the present invention is not prior art, and therefore FIG. 19 is not labeled as prior art.

It is to be noted that the processor 1503 or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. Furthermore, aspects of the invention can be implemented in a computer program product tangibly embodied in a carrier medium carrying machine-readable code for execution by a programmable processor. Method steps of aspects of the invention may be performed by a programmable processor executing instructions to perform functions of those aspects of the invention, e.g., by operating on input data and generating output data.

The above processing system may be for use in a flight simulator as for example illustrated in FIG. 20.

It is to be understood that although preferred embodiments have been discussed herein for methods and devices according to the present invention, various changes or modifications in form and detail may be made without departing from the scope and spirit of this invention.

The invention claimed is:

1. A method to control the movements of a flight simulator motion system having a pilot's seat and at least two degrees of freedom, the at least two degrees of freedom including a lateral position (y) and a roll angle (φ), wherein the control of the movements involves linear and angular accelerations perceivable by a pilot seated at the pilot's seat, wherein roll rate (p) and yaw rate (r), as well as a specific force in a lateral direction ($A_y$) calculated according to a model of a simulated aircraft in a fixed point of the simulated aircraft are converted by a motion program to the lateral position (y) and the roll angle (φ) of the simulator, and wherein the method comprises the step of:

calculating the roll angle (φ) of the simulator due to simulated aircraft roll angle by correcting an originally calculated value ($φ_{hp}$) of the roll angle (φ) with a correction factor ($φ_{cor}$) proportional to a lateral specific force induced by a wash-out filter used during the earth gravity alignment calculation of the lateral position (y) of the simulator, wherein calculating the roll angle ($φ_{roll}$) of the simulator comprises using a mathematical transformation involving the feed-forward of a correction angle ($φ_{cor}$) in the roll angle transformation function according to the formulae:

$$φ_{cor} = K_y \cdot φ_{hp} - \ddot{y}_{roll}/g$$

$$φ_{roll} = φ_{hp} - φ_{cor}$$

where φ-hp equals high pass filtered simulator roll angle,
ÿ-roll equals lateral position acceleration of the pilots' reference point P, being the result of multiplying φ-hp with a gain Ky and g and then high pass filtering,
g is the earth gravity constant,
Ky is a gain lateral co-ordination factor,
φ-roll equals the simulator roll angle as a result of simulated aircraft roll acceleration or roll rate.

2. The method according to claim 1, wherein in said mathematical transformation a lateral co-ordination factor Ky between 0 and 1 is introduced, allowing to reduce lateral travel at the expense of some acceptable spurious lateral specific force, by modulating between a 'no co-ordination' case whereby Ky=0 and a 'full co-ordination' case whereby Ky=1.

3. The method according to claim 2, wherein Ky=1, and the roll angle ($\phi$-roll) is obtained by a 3rd or $4^{th}$ order high-pass filter on simulated aircraft roll rate and lateral acceleration is at each time equal to this roll angle ($\phi$-roll) multiplied by the earth acceleration (g).

4. The method according to claim 1, wherein the mathematical transformation involves a $2^{nd}$ order roll angle ($\phi$-roll) high pass filter and a $1^{st}$ order y-washout filter, according to the transfer function formulae:

$$\left[\frac{\varphi_{hp}}{p_{ltd}}\right] = \frac{P}{P^2 + 2\xi\omega_0 P + \omega_0^2}$$

$$\left[\frac{\ddot{y}_{roll}/g}{\varphi_{hp}}\right] = K_y \cdot \frac{P}{P + \frac{1}{\tau}}$$

where $p_{ltd}$=input roll rate limited through a down tuning gain factor Kd, and optionally a roll rate limiting function, in such way that for a step in aileron command, the simulator lateral travel is of finite value, and where P stands for Laplace operator.

5. A method according to claim 1, wherein the mathematical transformation involves a $1^{st}$ order roll angle high pass filter ($\phi_{hp}$) and a $2^{nd}$ order y-washout filter.

6. A computer program product comprising a non-transitory computer readable storage medium having machine-readable code stored thereon which, when executed by a processor of a computing device associated with a flight simulator simulating an aircraft, causes the processor to perform the step of the method as claimed in claim 1.

7. A method to control the movements of a flight simulator motion system having a pilot's seat and at least two degrees of freedom, the at least two degrees of freedom including a lateral position (y) and a roll angle ($\phi$), wherein the control of the movements involves linear and angular accelerations perceivable by a pilot seated at the pilot's seat, wherein roll rate (p) and yaw rate (r), as well as a specific force in a lateral direction ($A_y$) calculated according to a model of a simulated aircraft in a fixed point of the simulated aircraft are converted by a motion program to the lateral position (y) and the roll angle ($\phi$) of the simulator, and wherein the method comprises the step of:

decomposing the specific force in the lateral direction ($A_{y\text{-}pilot}$) acting at the pilot's reference point in the simulated aircraft into a first component and a second component, the first component relating to the specific force ($A_y$) at the fixed point of the simulated aircraft and the second component having a first term related to accelerations due to yaw (r) and a second term related to roll (p) angular accelerations, according to the formula:

$$A_{ypilot} = A_y + \dot{r} \cdot xp_{ac} - \dot{p} \cdot zp_{ac}$$

$xp_{ac}$ being the x coordinate of the pilot's reference point (P) in a reference system having an origin at the fixed point of the simulated aircraft and $zp_{ac}$ being the z coordinate of the pilot's reference point in said reference system, $\dot{p}$ being the roll angular acceleration and $\dot{r}$ being the yaw angular acceleration;

filtering the first component ($A_y$) through two filters, a high-pass filter and a low-pass filter;

filtering each of the terms of the second component by a set of a first and a second complementary filters in parallel, complementary filters being filters whose sum of transfer functions is one; and using the sum of the output of the high-pass filter and of the output of the first of the complementary filters of each set to calculate the desired simulator lateral position (y), and using the sum of the output of the low-pass filter and of the output of the second of the complementary filters of each set to calculate the desired simulator roll angle ($\phi$).

8. The method according to claim 7, wherein the second component of the specific force in the lateral direction is obtained by means of four additional filters: a first set of two complementary filters for roll acceleration and a second set of two complementary filters for yaw acceleration, in each set of complementary filters, one is commanding a simulator lateral excursion and the other commanding a simulator roll angle, according to the transfer function formulae:

$$\left[\frac{y_{A_{yp}}}{p_{ltd}}\right] = \frac{-zp_{ac} \cdot (P + 2\xi\omega_1)}{P^2 + 2\xi\omega_1 P + \omega_1^2}$$

$$\left[\frac{\varphi_{A_{yp}}}{p_{ltd}}\right] = \frac{zp_{ac}}{g} \cdot \frac{\omega_1^2 \cdot P}{P^2 + 2\xi\omega_1 P + \omega_1^2}$$

and $$\left[\frac{y_{A_{yr}}}{r_{ltd}}\right] = xp_{ac} \cdot \frac{P + 2\xi\omega_2}{P^2 + 2\xi\omega_2 P + \omega_2^2}$$

$$\left[\frac{\varphi_{A_{yr}}}{r_{ltd}}\right] = -\frac{xp_{ac}}{g} \cdot \frac{\omega_2^2 P}{P^2 + 2\xi\omega_2 P + \omega_2^2}$$

where $p_{ltd}$ and $r_{ltd}$ are input roll and yaw rate respectively, limited through a down tuning gain factor Kp and Kr respectively, and optionally through a rate limiting function, and P stands for Laplace operator.

9. The method according to claim 7, wherein the fixed point of the simulated aircraft is the centre of gravity of said simulated aircraft.

10. A controller for controlling the movements of a flight simulator motion system having a pilot's seat and at least two degrees of freedom, the two degrees of freedom including a lateral position (y) and a roll angle ($\phi$), wherein the control of the movements involves linear and angular accelerations perceivable by a pilot seated at the pilot's seat, wherein roll rate (p) and yaw rate (r), as well as a specific force in a lateral direction ($A_y$) calculated according to a model of a simulated aircraft in a fixed point of the simulated aircraft are converted by a motion program to the lateral position (y) and the roll angle ($\phi$) of the simulator, said controller comprising:

both (a) a first calculator configured to calculate the roll angle ($\phi$) of the simulator due to simulated aircraft roll angle by correcting an originally calculated value ($\phi_{hp}$) of the roll angle ($\phi$) with a correction factor ($\phi_{cor}$) proportional to a lateral specific force induced by a wash-out filter used during the earth gravity alignment calculation of the lateral position (y) of the simulator; and (b) a second calculator configured to decompose the specific force in the lateral direction ($A_{ypilot}$) acting at the pilot's reference point in the simulated aircraft into a first component and a second component, the first component relating to the specific force ($A_y$) at the fixed point of the simulated aircraft and the second component having a first term related to accelerations due to yaw (r) and a second term related to roll (p) angular accelerations, according to the formula:

$$A_{ypilot} = A_y + \dot{r} \cdot xp_{ac} - \dot{p} \cdot zp_{ac}$$

$xp_{ac}$ being the x coordinate of the pilot's reference point (P) in a reference system having an origin at the fixed point of the simulated aircraft and $zp_{ac}$ being the z coordinate of the pilot's reference point in said reference system, $\dot{p}$ being the roll angular acceleration and $\dot{r}$ being the yaw angular acceleration;

a high-pass filter and a low-pass filter for filtering the first component ($A_y$);

two sets of a first and a second complementary filter, complementary filters being filters whose sum of transfer functions is one, for filtering each of the terms of the second component in parallel; and a combiner for combining the output of the high-pass filter and the outputs of the first of the complementary filters of each set to calculate the desired simulator lateral position (y), and a combiner for combining the output of the low-pass filter and the outputs of the second of the complementary filters of each set to calculate the desired simulator roll angle ($\phi$);

or (b) a second calculator configured to decompose the specific force in the lateral direction ($A_{ypilot}$) acting at the pilot's reference point in the simulated aircraft into a first component and a second component, the first component relating to the specific force ($A_y$) at the fixed point of the simulated aircraft and the second component having a first term related to accelerations due to yaw (r) and a second term related to roll (p) angular accelerations, according to the formula:

$$A_{ypilot} = A_y + \dot{r} \cdot xp_{ac} - \dot{p} \cdot zp_{ac}$$

$xp_{ac}$ being the x coordinate of the pilot's reference point (P) in a reference system having an origin at the fixed point of the simulated aircraft and $zp_{ac}$ being the z coordinate of the pilot's reference point in said reference system, $\dot{p}$ being the roll angular acceleration and $\dot{r}$ being the yaw angular acceleration;

a high-pass filter and a low-pass filter for filtering the first component ($A_y$);

two sets of a first and a second complementary filter, complementary filters being filters whose sum of transfer functions is one, for filtering each of the terms of the second component in parallel; and a combiner for combining the output of the high-pass filter and the outputs of the first of the complementary filters of each set to calculate the desired simulator lateral position (y), and a combiner for combining the output of the low-pass filter and the outputs of the second of the complementary filters of each set to calculate the desired simulator roll angle ($\phi$).

11. A flight simulator motion system having a pilot's seat and at least two degrees of freedom, the two degrees of freedom including a lateral position (y) and a roll angle ($\phi$), wherein the flight simulator is configured to perform controlled movements, involving linear and angular accelerations perceivable by a pilot seated at the pilot's seat, wherein roll rate (p) and yaw rate (r), as well as a specific force in a lateral direction ($A_y$) calculated according to a model of a simulated aircraft in a fixed point of the simulated aircraft are converted by a motion program to a lateral position (y) and a roll angle ($\phi$) of the simulator, said flight simulator comprising:

both (a) a first calculator configured to calculate the roll angle ($\phi$) of the simulator due to simulated aircraft roll angle by correcting an originally calculated value ($\phi_{hp}$) of the roll angle ($\phi$) with a correction factor ($\phi_{cor}$) proportional to a lateral specific force induced by a washout filter used during the earth gravity alignment calculation of the lateral position (y) of the simulator; and (b) a second calculator configured to decompose the specific force in the lateral direction ($A_{ypilot}$) acting at the pilot's reference point in the simulated aircraft into a first component and a second component, the first component relating to the specific force ($A_y$) at the fixed point of the simulated aircraft and the second component having a first term related to accelerations due to yaw (r) and a second term related to roll (p) angular accelerations, according to the formula:

$$A_{ypilot} = A_y + \dot{r} \cdot xp_{ac} - \dot{p} \cdot zp_{ac}$$

$xp_{ac}$ being the x coordinate of the pilot's reference point (P) in a reference system having an origin at the fixed point of the simulated aircraft and $zp_{ac}$ being the z coordinate of the pilot's reference point in said reference system, $\dot{p}$ being the roll angular acceleration and $\dot{r}$ being the yaw angular acceleration;

a high-pass filter and a low-pass filter for filtering the first component ($A_y$); two sets of a first and a second complementary filter, complementary filters being filters whose sum of transfer functions is one, for filtering each of the terms of the second component in parallel; and a combiner for combining the output of the high-pass filter and the outputs of the first of the complementary filters of each set to calculate the desired simulator lateral position (y), and a combiner for combining the output of the low-pass filter and the outputs of the second of the complementary filters of each set to calculate the desired simulator roll angle ($\phi$);

or (b) a second calculator configured to decompose the specific force in the lateral direction ($A_{ypilot}$) acting at the pilot's reference point in the simulated aircraft into a first component and a second component, the first component relating to the specific force ($A_y$) at the fixed point of the simulated aircraft and the second component having a first term related to accelerations due to yaw (r) and a second term related to roll (p) angular accelerations, according to the formula:

$$A_{ypilot} = A_y + \dot{r} \cdot xp_{ac} - \dot{p} \cdot zp_{ac}$$

$xp_{ac}$ being the x coordinate of the pilot's reference point (P) in a reference system having an origin at the fixed point of the simulated aircraft and $zp_{ac}$ being the z coordinate of the pilot's reference point in said reference system, $\dot{p}$ being the roll angular acceleration and $\dot{r}$ being the yaw angular acceleration;

a high-pass filter and a low-pass filter for filtering the first component ($A_y$); two sets of a first and a second complementary filter, complementary filters being filters whose sum of transfer functions is one, for filtering each of the terms of the second component in parallel; and a combiner for combining the output of the high-pass filter and the outputs of the first of the complementary filters of each set to calculate the desired simulator lateral position (y), and a combiner for combining the output of the low-pass filter and the outputs of the second of the complementary filters of each set to calculate the desired simulator roll angle ($\phi$).

12. A method to control the movements of a flight simulator motion system having a pilot's seat and at least two degrees of freedom, the at least two degrees of freedom including a lateral position (y) and a roll angle (φ), wherein the control of the movements involves linear and angular accelerations perceivable by a pilot seated at the pilot's seat, wherein roll rate (p) and yaw rate (r), as well as a specific force in a lateral direction ($A_y$) calculated according to a model of a simulated aircraft in a fixed point of the simulated aircraft are converted by a motion program to the lateral position (y) and the roll angle (φ) of the simulator, and wherein the method comprises the steps of:

(a) calculating the roll angle (φ) of the simulator due to simulated aircraft roll angle by correcting an originally calculated value ($φ_{hp}$) of the roll angle (φ) with a correction factor ($φ_{cor}$) proportional to a lateral specific force induced by a wash-out filter used during the earth gravity alignment calculation of the lateral position (y) of the simulator; and (b) decomposing the specific force in the lateral direction ($A_{ypilot}$) acting at the pilot's reference point in the simulated aircraft into a first component and a second component, the first component relating to the specific force ($A_y$) at the fixed point of the simulated aircraft and the second component having a first term related to accelerations due to yaw (r) and a second term related to roll (φ) angular accelerations, according to the formula:

$$A_{ypilot}=A_y+\dot{r}\cdot xp_{ac}-\dot{p}\cdot zp_{ac}$$

$xp_{ac}$ being the x coordinate of the pilot's reference point (P) in a reference system having an origin at the fixed point of the simulated aircraft and $zp_{ac}$ being the z coordinate of the pilot's reference point in said reference system, $\dot{p}$ being the roll angular acceleration and $\dot{r}$ being the yaw angular acceleration;

filtering the first component ($A_y$) through two filters, a high-pass filter and a low-pass filter;

filtering each of the terms of the second component by a set of a first and a second complementary filters in parallel, complementary filters being filters whose sum of transfer functions is one; and using the sum of the output of the high-pass filter and of the output of the first of the complementary filters of each set to calculate the desired simulator lateral position (y), and using the sum of the output of the low-pass filter and of the output of the second of the complementary filters of each set to calculate the desired simulator roll angle (φ).

13. A method for compensating for a spurious lateral specific force of a flight simulator motion system having a roll angle (φ) and a lateral position (y), which is executed by a processor, comprising the steps of:

receiving an originally calculated value ($φ_{hp}$) of the roll angle (φ); and calculating the roll angle (φ) of the simulator due to simulated aircraft roll angle by correcting the originally calculated value ($φ_{hp}$) of the roll angle (φ) with a correction factor ($φ_{cor}$) proportional to a lateral specific force induced during the earth gravity alignment calculation of the lateral position (y) of the simulator, wherein calculating the roll angle ($φ_{roll}$) of the simulator comprises using a mathematical transformation involving the feed-forward of a correction angle ($φ_{cor}$) in the roll angle transformation function according to the formulae:

$$φ_{cor}=K_y\cdot φ_{hp}-\ddot{y}_{roll}/g$$

$$φ_{roll}=φ_{hp}-φ_{cor}$$

where φ-hp equals high pass filtered simulator roll angle,
$\ddot{y}$-roll equals lateral position acceleration of the pilots' reference point P, being the result of multiplying φ-hp with a gain Ky and g and then high pass filtering,
g is the earth gravity constant,
Ky is a gain lateral co-ordination factor,
φ-roll equals the simulator roll angle as a result of simulated aircraft roll acceleration or roll rate.

14. A non-transitory computer readable storage medium having machine-readable code stored thereon which, when executed by a processor of a computing device associated with a flight simulator simulating an aircraft, causes the processor to perform the steps of the method as claimed in claim 13.

15. A method for compensating for a lateral side force due to angular rotation of a flight simulator motion system having a roll angle (φ) and a lateral position (y), which is executed by a processor, comprising the steps of:

decomposing a specific force in the lateral direction ($A_{ypilot}$) acting at the pilot's reference point in the simulated aircraft into a first component and a second component, the first component relating to the specific force ($A_y$) at a fixed point of the simulated aircraft and the second component having a first term related to accelerations due to yaw (r) and a second term related to roll (p) angular accelerations, according to the formula:

$$A_{ypilot}=A_y+\dot{r}\cdot xp_{ac}-\dot{p}\cdot zp_{ac}$$

$xp_{ac}$ being the x coordinate of the pilot's reference point (P) in a reference system having an origin at the fixed point of the simulated aircraft and $zp_{ac}$ being the z coordinate of the pilot's reference point in said reference system, $\dot{p}$ being the roll angular acceleration and $\dot{r}$ being the yaw angular acceleration;

filtering the first component ($A_y$) through two filters, a high-pass filter and a low-pass filter;

filtering each of the terms of the second component by a set of a first and a second complementary filters in parallel, complementary filters being filters whose sum of transfer functions is one; and using the sum of the output of the high-pass filter and of the output of the first of the complementary filters of each set to calculate the desired simulator lateral position (y), and using the sum of the output of the low-pass filter and of the output of the second of the complementary filters of each set to calculate the desired simulator roll angle (φ).

16. A non-transitory computer readable storage medium having machine-readable code stored thereon which, when executed by a processor of a computing device associated with a flight simulator simulating an aircraft, causes the processor to perform the steps of the method as claimed in claim 15.

17. A method to control the movements of a flight simulator motion system having a pilot's seat and at least two degrees of freedom, the at least two degrees of freedom including a lateral position (y) and a roll angle (φ), wherein the control of the movements involves linear and angular accelerations perceivable by a pilot seated at the pilot's seat, wherein roll rate (p) and yaw rate (r), as well as a specific force in a lateral direction ($A_y$) calculated according to a model of a simulated aircraft in a fixed point of the simulated aircraft are converted by a motion program to the lateral position (y) and the roll angle (φ) of the simulator, and wherein the method comprises the step of:

decomposing the specific force in the lateral direction ($A_{ypilot}$) acting at the pilot's reference point in the simulated aircraft into a first component and a second component, the first component relating to the specific force ($A_y$) at the fixed point of the simulated aircraft and the second component having a first term related to accelerations due to yaw (r) and a second term related to roll (p) angular accelerations, according to the formula:

$$A_{ypilot} = A_y + \dot{r} \cdot xp_{ac} - \dot{p} \cdot zp_{ac}$$

$xp_{ac}$ being the x coordinate of the pilot's reference point (P) in a reference system having an origin at the fixed point of the simulated aircraft and $zp_{ac}$ being the z coordinate of the pilot's reference point in said reference system, $\dot{p}$ being the roll angular acceleration and $\dot{r}$ being the yaw angular acceleration;

filtering the first component ($A_y$) through two filters, a high-pass filter and a low-pass filter;

filtering each of the terms of the second component by a set of a first and a second filters in parallel; and using the sum of the output of the high-pass filter and of the output of the first of the filters of each set to calculate the desired simulator lateral position (y), and using the sum of the output of the low-pass filter and of the output of the second of the filters of each set to calculate the desired simulator roll angle ($\phi$).

\* \* \* \* \*